US005543588A

United States Patent [19]
Bisset et al.

[11] Patent Number: 5,543,588
[45] Date of Patent: Aug. 6, 1996

[54] TOUCH PAD DRIVEN HANDHELD COMPUTING DEVICE

[75] Inventors: Stephen Bisset, Palo Alto; Robert J. Miller, Fremont; Timothy P. Allen, Los Gatos; Günter Steinbach, Palo Alto, all of Calif.

[73] Assignee: Synaptics, Incorporated, San Jose, Calif.

[21] Appl. No.: 161,671

[22] Filed: Dec. 3, 1993

(Under 37 CFR 1.47)

Related U.S. Application Data

[63] Continuation-in-part of Ser. No. 895,934, Jun. 8, 1992, and a continuation-in-part of Ser. No. 115,743, Aug. 31, 1993, Pat. No. 5,374,787.

[51] Int. Cl.$^6$ ............................. G08C 21/00; G09G 5/00
[52] U.S. Cl. ............................................. 178/18; 345/173
[58] Field of Search .......................... 178/18, 19; 341/33, 341/34; 345/173, 174

[56] References Cited

U.S. PATENT DOCUMENTS 5,327,163  7/1994  Hashimoto et al. ................ 178/18 X

FOREIGN PATENT DOCUMENTS 2662528  11/1991  European Pat. Off. .

*Primary Examiner*—Stephen Chin
*Assistant Examiner*—Kevin Kim
*Attorney, Agent, or Firm*—D'Alessandro & Ritchie

[57] ABSTRACT

A handheld computing device comprises a thin enclosure having two opposing major faces. A display screen is disposed on a first one of the major opposing faces of the enclosure and a touch-sensitive object position detector input device is disposed on a second one of the major opposing faces of the enclosure. Computing device circuitry, circuitry for interfacing the touch-sensitive object position detector to the computing device circuitry, and circuitry for driving the display screen are all disposed within the enclosure.

4 Claims, 15 Drawing Sheets

TOUCH PAD DRIVEN HANDHELD COMPUTING DEVICE

RELATED APPLICATIONS

This application is a continuation-in-part of application Ser. No. 07/895,934, filed Jun. 8, 1992, and of application Ser. No. 08/115,743, filed Aug. 31, 1993, now U.S. Pat. No. 5,374,787 entitled OBJECT POSITION DETECTOR.

BACKGROUND OF THE INVENTION

1. Field of the Invention

The present invention relates to handheld computing devices such as personal digital assistants, pocket calendars, communicators, home remote control units and calculators. In particular, the present invention relates to computing devices that are meant to be very compact and possibly carried in a pocket or purse and which employ touch sensing technology as the major means of data input. Personal digital assistants are computing devices that will include all of these areas and maintain personal schedulers, telephone books, etc.

2. The Prior Art

There are several available touch-sense technologies which may be employed for use as a position indicator. Resistive-membrane position sensors are known and used in several applications. However, they generally suffer from poor resolution, the sensor surface is exposed to the user and is thus subject to wear. In addition, resistive-membrane touch sensors are relatively expensive. A one-surface approach requires a user to be grounded to the sensor for reliable operation. This cannot be guaranteed in portable computers. An example of a one-surface approach is the UnMouse product by MicroTouch, of Wilmington, Mass. A two-surface approach has poorer resolution and potentially will wear out very quickly in time.

Resistive tablets are taught by U.S. Pat. No. 4,680,430 to Yoshikawa, U.S. Pat. No. 3,497,617 to Ellis and many others. The drawback of all such approaches is the high power consumption and the high cost of the resistive membrane employed.

Surface Acoustic Wave (SAW) devices have potential use as position indicators. However, this sensor technology is expensive and is not sensitive to light touch. In addition, SAW devices are sensitive to residue buildup on the touch surfaces and generally have poor resolution.

Strain gauge or pressure plate approaches are an interesting position sensing technology, but suffer from several drawbacks. This approach may employ piezoelectric transducers. One drawback is that the piezo phenomena is an AC phenomena and may be sensitive to the user's rate of movement. In addition, strain gauge or pressure plate approaches are a somewhat expensive because special sensors are required.

Optical approaches are also possible but are somewhat limited for several reasons. All would require light generation which will require external components and increase cost and power drain. For example, a "finger-breaking" infra-red matrix position detector consumes high power and suffers from relatively poor resolution.

There have been numerous attempts to provide a device for sensing the position of thumb or other finger for use as a pointing device to replace a mouse or trackball. Desirable attributes of such a device are low power, low profile, high resolution, low cost, fast response, and ability to operate reliably when the finger carries electrical noise, or when the touch surface is contaminated with dirt or moisture.

Because of the drawbacks of resistive devices, many attempts have been made to provide pointing capability based on capacitively sensing the position of the finger. U.S. Pat. No. 3,921,166 to Volpe teaches a capacitive matrix in which the finger changes the transcapacitance between row and column electrodes. U.S. Pat. No. 4,103,252 to Bobick employs four oscillating signals to interpolate x and y positions between four capacitive electrodes. U.S. Pat. No. 4,455,452 to Schuyler teaches a capacitive tablet wherein the finger attenuates the capacitive coupling between electrodes.

U.S. Pat. No. 4,550,221 to Mabusth teaches a capacitive tablet wherein the effective capacitance to "virtual ground" is measured by an oscillating signal. Each row or column is polled sequentially, and a rudimentary form of interpolation is applied to resolve the position between two rows or columns. An attempt is made to address the problem of electrical interference by averaging over many cycles of the oscillating waveform. The problem of contamination is addressed by sensing when no finger was present, and applying a periodic calibration during such no-finger-present periods. U.S. Pat. No. 4,639,720 to Rympalski teaches a tablet for sensing the position of a stylus. The stylus alters the transcapacitance coupling between row and column electrodes, which are scanned sequentially. U.S. Pat. No. 4,736,191 to Matzke teaches a radial electrode arrangement under the space bar of a keyboard, to be activated by touching with a thumb. This patent teaches the use of total touch capacitance, as an indication of the touch pressure, to control the velocity of cursor motion. Pulsed sequential polling is employed to address the effects of electrical interference.

U.S. Pat. Nos. 4,686,332 and 5,149,919, to Greanias, teaches a stylus and finger detection system meant to be mounted on a CRT. As a finger detection system, its X/Y sensor matrix is used to locate the two matrix wires carrying the maximum signal. With a coding scheme these two wires uniquely determine the location of the finger position to the resolution of the wire stepping. For stylus detection, Greanias first coarsely locates it, then develops a virtual dipole by driving all lines on one side of the object in one direction and all lines on the opposite side in the opposite direction. This is done three times with different dipole phases and signal polarities. Assuming a predetermined matrix response to the object, the three measurements present a set of simultaneous equations that can be solved for position.

U.S. Pat. No. 4,733,222 to Evans is the first to teach a capacitance touch measurement system that interpolates to a high degree. Evans teaches a three terminal measurement system that uses a drive, sense and electrode signal set (3 signals) in its matrix, and bases the measurement on the attenuation effect of a finger on the electrode node signal (uses a capacitive divider phenomena). Evans sequentially scans through each drive set to measure the capacitance. From the three largest responses an interpolation routine is applied to determine finger position. Evans also teaches a zeroing technique that allows "no-finger" levels to be cancelled out as part of the measurement.

U.S. Pat. No. 5,016,008 to Gruaz describes a touch sensitive pad that also uses interpolation. Gruaz uses a drive and sense signal set (2 signals) in the touch matrix and like Evans relies on the attenuation effect of a finger to modulate the drive signal. The touch matrix is sequentially scanned to read each matrix lines response. An interpolation program then selects the two largest adjacent signals in both dimensions to determine the finger location, and ratiometrically determines the effective position from those 4 numbers.

Gerpheide, PCT application U.S. Ser. No. 90/04584, publication No. WO91/03039, applies to a touch pad system a variation of the virtual dipole approach of Greanias. Gerpheide teaches the application of an oscillating potential of a given frequency and phase to all electrodes on one side of the virtual dipole, and an oscillating potential of the same frequency and opposite phase to those on the other side. Electronic circuits develop a "balance signal" which is zero when no finger is present, and which has one polarity if a finger is on one side of the center of the virtual dipole, and the opposite polarity if the finger is on the opposite side. To acquire the position of the finger initially, the virtual dipole is scanned sequentially across the tablet. Once the finger is located, it is "tracked" by moving the virtual dipole toward the finger once the finger has moved more than one row or column.

Because the virtual dipole method operates by generating a balance signal that is zero when the capacitance does not vary with distance, it only senses the perimeter of the finger contact area, rather than the entire contact area. Because the method relies on synchronous detection of the exciting signal, it must average for long periods to reject electrical interference, and hence it is slow. The averaging time required by this method, together with the necessity to search sequentially for a new finger contact once a previous contact is lost, makes this method, like those before it, fall short of the requirements for a fast pointing device that is not affected by electrical interference.

It should also be noted that all previous touch pad inventions that used interpolation placed rigorous design requirements on their sensing pad. Greanias and Evans use a complicated and expensive drive, sense and electrode line scheme to develop their signal. Gruaz and Gerpheide use a two signal drive and sense set. In the present invention the driving and sensing is done on the same line. This allows the row and column sections to be symmetric and equivalent. This in turn allows independent calibration of all signal paths, which makes board layout simpler and less constraining, and allows for more unique sensor topologies.

The shortcomings of the inventions and techniques described in the prior art can also be traced to the use of only one set of driving and sensing electronics, which was multiplexed sequentially over the electrodes in the tablet. This arrangement was cost effective in the days of discrete components, and avoided offset and scale differences among circuits.

The sequential scanning approach of previous systems also made them more susceptible to noise. Noise levels could change between successive measurements, thus changing the measured signal and the assumptions used in interpolation routines.

Finally, all previous approaches assumed a particular signal response for finger position versus matrix position. Because the transfer curve is very sensitive to many parameters and is not a smooth linear curve as Greanias and Gerpheide assume, such approaches are limited in the amount of interpolation they can perform.

The touch sensing technology of the present invention may be particularly useful when employed as an input transducer for a handheld computing device. Numerous handheld computing devices such as personal digital assistants have been appearing on the market. Examples are Sharp's Wizard, Apple's Newton and similar Hewlett Packard products. Presently most of these devices use either a miniature keypad input or some type of stylus on top of an LCD display.

In all cases the market push is for smaller and more compact systems that eventually fit easily into ones pocket or purse. High levels of integration have driven down the size of computing devices to the level where a reasonably powerful computing device can fit in the volume of a credit card. One of the significant obstacles in reducing the size of such computing devices has been the size of the user input interface. A keypad input or stylus/finger on top of an LCD display, which is the industry-standard input paradigm, is currently a limiting factor.

As will be appreciated by those of ordinary skill in the art, keypads obviously have a certain minimum size below which they are no longer useful. The input regime wherein a stylus/finger is moved across the surface of an LCD display will suffer from interference of view. Because the display screens must necessarily be small, the presence of a stylus or finger writing on the screen tends to block the user's view of a large portion of the screen.

It is thus an object of the present invention to provide a two-dimensional capacitive sensing system equipped with a separate set of drive/sense electronics for each row and for each column of a capacitive tablet, wherein all row electrodes are sensed simultaneously, and all column electrodes are sensed simultaneously.

It is a further object of the present invention to provide an electronic system that is sensitive to the entire area of contact of a finger with a capacitive tablet, and to provide as output the coordinates of some measure of the center of this contact area while remaining insensitive to the characteristic profile of the object being detected.

It is a further object of the present invention to provide an electronic system that provides as output some measure of area of contact of a finger with a capacitive tablet.

Yet another object of the present invention to provide a handheld computing device where almost the entire surface area of one face of the device can be used as a display and where the main means for data entry by a user is disposed on a second face of the device.

Yet another object of this invention to provide a low-cost, low-parts-count input transducer for a handheld computing device using a touch pad technology such as the one described in co-pending application Ser. Nos. 07/895,934 and 08/115,743, now U.S. Pat. No. 5,734,787.

BRIEF DESCRIPTION OF THE INVENTION

With the advent of very high levels of integration, it has become possible to integrate many channels of driving/sensing electronics into one integrated circuit, along with the control logic for operating them, and the interface electronics to allow the pointing device to communicate directly with a host microprocessor. The present invention uses adaptive analog techniques to overcome offset and scale differences between channels, and can thus sense either transcapacitance or self-capacitance of all tablet rows or columns in parallel. This parallel-sensing capability, made possible by providing one set of electronics per row or column, allows the sensing cycle to be extremely short, thus allowing fast response while still maintaining immunity to very high levels of electrical interference.

The present invention comprises a position-sensing technology particularly useful for applications where finger position information is needed, such as in computer "mouse" or trackball environments. However the position-sensing technology of the present invention has much more general application than a computer mouse, because its sensor can detect and report if one or more points are being touched. In addition, the detector can sense the pressure of the touch.

According to a preferred embodiment of the present invention, referred to herein as a "finger pointer" embodiment, a position sensing system includes a position sensing transducer comprising a touch-sensitive surface disposed on a substrate, such as a printed circuit board, including a matrix of conductive lines. A first set of conductive lines runs in a first direction and is insulated from a second set of conductive lines running in a second direction generally perpendicular to the first direction. An insulating layer is disposed over the first and second sets of conductive lines. The insulating layer is thin enough to promote significant capacitive coupling between a finger placed on its surface and the first and second sets of conductive lines.

Sensing electronics respond to the proximity of a finger to translate the capacitance changes of the conductors caused by finger proximity into position and touch pressure information. Its output is a simple X, Y and pressure value of the one object on its surface.

Different prior art pad scan techniques have different advantages in different environments. Parallel drive/sense techniques according to the present invention allow input samples to be taken simultaneously, thus all channels are affected by the same phase of an interfering electrical signal, greatly simplifying the signal processing and noise filtering.

There are two drive/sense methods employed in the touch sensing technology of the present invention. According to a first and presently preferred embodiment of the invention, the voltages on all of the X lines of the sensor matrix are simultaneously moved, while the voltages of the Y lines are held at a constant voltage, with the complete set of sampled points simultaneously giving a profile of the finger in the X dimension. Next, the voltages on all of the Y lines of the sensor matrix are simultaneously moved, while the voltages of the X lines are held at a constant voltage to obtain complete set of sampled points simultaneously giving a profile of the finger in the other dimension.

According to a second drive/sense method, the voltages on all of the X lines of the sensor matrix are simultaneously moved in a positive direction, while the voltages of the Y lines are moved in a negative direction. Next, the voltages on all of the X lines of the sensor matrix are simultaneously moved in a negative direction, while the voltages of the Y lines are moved in a positive direction. This technique doubles the effect of any transcapacitance between the two dimensions, or conversely, halves the effect of any parasitic capacitance to ground. In both methods, the capacitive information from the sensing process provides a profile of the proximity of the finger to the sensor in each dimension.

Both embodiments then take these profiles and calculate the centroid for X and Y position and integrate under the curve for the Z pressure information. The position sensor of these embodiments can only report the position of one object on its sensor surface. If more than one object is present, the position sensor of this embodiment computes the centroid position of the combined set of objects. However, unlike prior art, because the entire pad is being profiled, enough information is available to discern simple multi-finger gestures to allow for a more powerful user interface.

According to another aspect of the present invention, several power reduction techniques which can shut down the circuit between measurements have been integrated into the system. This is possible because the parallel measurement technique according to the present invention is so much faster than prior art techniques.

According to a further aspect of the invention, noise reduction techniques that are focused on reducing noise produced in typical computer environments are integrated into the system.

According to yet another aspect of the present invention, a capacitance measurement technique which is easier to calibrate and implement is employed.

A handheld computing device according to the present invention may be packaged in a small enclosure wherein a display is disposed on a first face of the device and a touch pad input device is disposed on a second face of the device. The touch pad input device is mapped one-to-one into the display on the front side of the module. Computing circuitry is contained in the enclosure and coupled to the visual display and to the touch panel. The computing circuitry accepts input information from the touch panel and displays visual information developed from the input information on the visual display.

The present invention uses the very dense touch pad input technology disclosed herein in a novel way to make the development of a credit card size handheld computing device practical. The space layout efficiency of this touch pad technology results from the use of printed circuit board traces as sensors and thereby doesn't require a special transducer. The present invention takes advantage of this by providing a novel arrangement whereby the input sensor is mounted on a face of the device opposite to the face upon which the display is disposed. By so positioning these elements of the invention, there is no interference between the display and the input touch pad, and the device may be configured in a minimum sized enclosure.

As a non-limiting illustration of a presently preferred embodiment of the invention, the handheld computing device of the present invention may, for example, take the form of a personal digital assistant. Such devices are known in the art and are used for such purposes as tracking personal schedules, maintaining a personal calendar and/or notepad, and providing a calculator. The output is displayed on an LCD display and may be organized in a menu driven fashion. For alphanumeric input a small keyboard would be displayed from which the user would select the characters needed by touching appropriate areas on the touchpad on the underside of the enclosure.

To use the device, the user would hold the unit in one hand (left hand for example/while sliding the index finger of the right hand under the display to select the items of interest. The left hand would also be used to operate a select switch on the upper or lower edge of the module, to allow for the click and select or click and drag idioms employed in mouse input to computers.

The benefits of the handheld computing device of the present invention are that it permits direct one-to-one control of cursor position, allows almost the full surface to be used for the display, and employs very inexpensive input technology. In addition, the finger or stylus does not obscure the view of the display, the finger can stay in contact with the cursor so that the cursor position is not lost, and a keyboard can be displayed for alphanumeric input.

BRIEF DESCRIPTION OF THE DRAWINGS

FIG. 3b is a schematic diagram of an illustrative schematic diagram of the charge integrator circuit of FIG. 3a.

DETAILED DESCRIPTION OF A PREFERRED EMBODIMENT

Figure 1A:
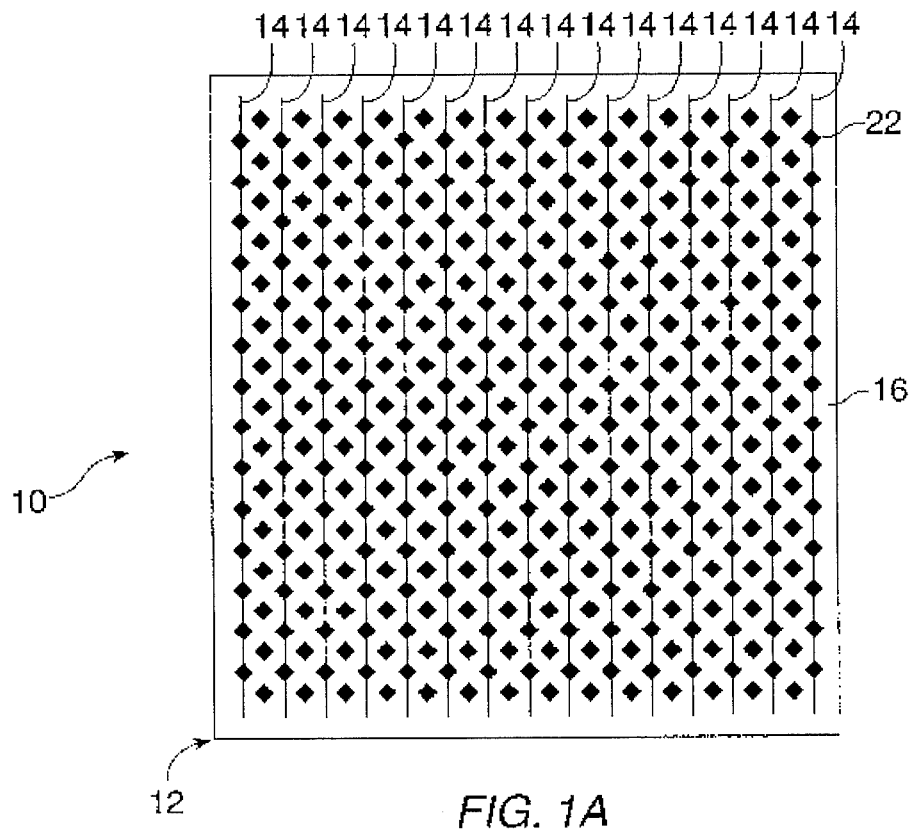
FIG. 1a is a top view of an object position sensor transducer according to a presently preferred embodiment of the invention showing the object position sensor surface layer including a top conductive trace layer and conductive pads connected to a bottom trace layer.
Figure 1B:
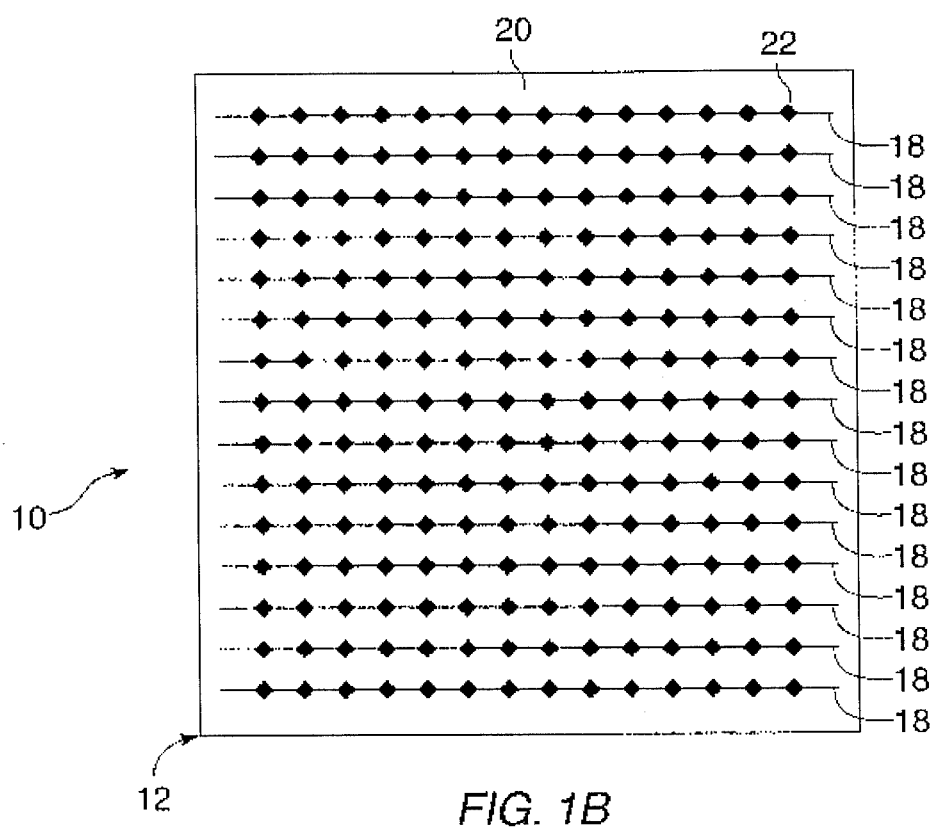
FIG. 1b is a bottom view of the object position sensor transducer of FIG. 1a showing the bottom conductive trace layer.
Figure 1C:
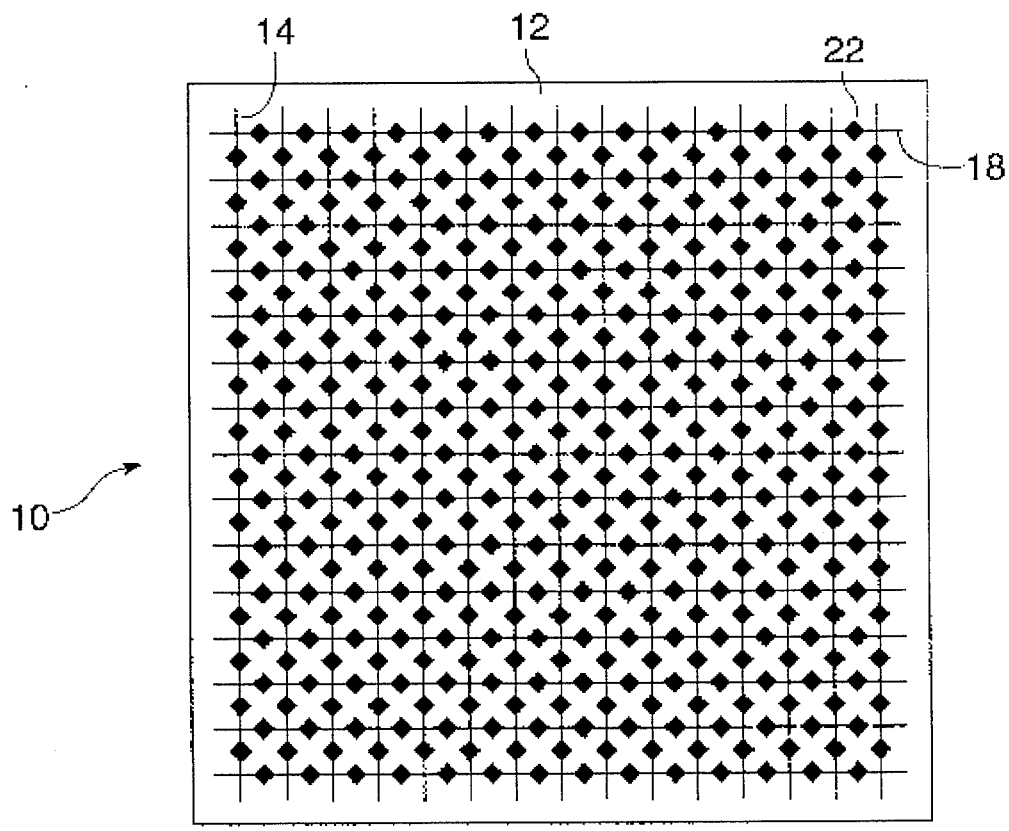
FIG. 1c is a composite view of the object position sensor transducer of FIGS. 1a and 1b showing both the top and bottom conductive trace layers.
Figure 1D:
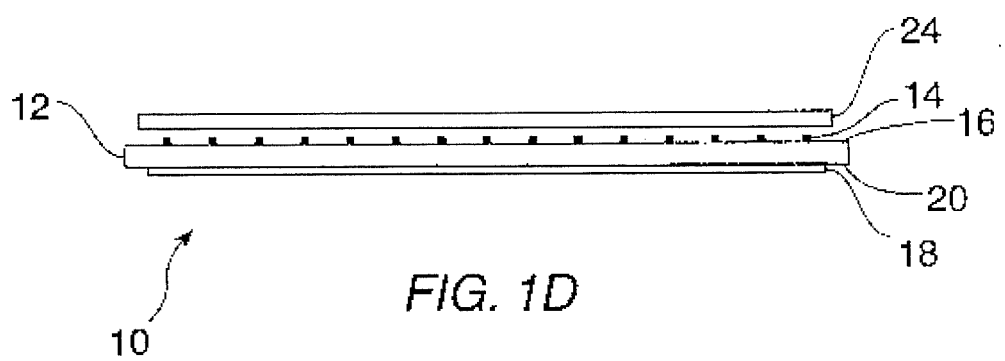
FIG. 1d is a cross-sectional view of the object position sensor transducer of FIGS. 1a–1c.

Those of ordinary skill in the art will realize that the following description of the present invention is illustrative only and not in any way limiting. Other embodiments of the invention will readily suggest themselves to such skilled persons.

The present invention brings together in combination a number of unique features which allow for new applications not before possible. Because the object position sensor of the present invention has very low power requirements, it is beneficial for use in battery operated or low power applications such as lap top or portable computers. It is also a very low cost solution, has no moving parts (and is therefore virtually maintenance free), and uses the existing printed circuit board traces for sensors. The sensing technology of the present invention can be integrated into a computer motherboard to even further lower its cost in computer applications. Similarly, in other applications the sensor can be part of an already existent circuit board.

Because of its small size and low profile, the sensor technology of the present invention is useful in lap top or portable applications where volume is important consideration. The sensor technology of the present invention requires circuit board space for only a single sensor interface chip that can interface directly to a microprocessor, plus the area needed on the printed circuit board for sensing.

The sensor material can be anything that allows creation of a conductive X/Y matrix of pads. This includes not only standard PC board, but also flexible PC board, conductive elastomer materials, silk-screened conductive lines, and piezo-electric Kynar plastic materials. This renders it useful as well in any portable equipment application or in human interface where the sensor needs to be molded to fit within the hand.

The sensor can be conformed to any three dimensional surface. Copper can be plated in two layers on most any surface contour producing the sensor. This will allow the sensor to be adapted to the best ergonomic form needed for a application. This coupled with the "light-touch" feature will make it effortless to use in many applications. The sensor can also be used in an indirect manner, i.e it can have a conductive foam over the surface and be used to detect any object (not just conductive) that presses against its surface.

Small sensor areas are practical, i.e., a presently conceived embodiment takes about 1.5"×1.5" of area, however those of ordinary skill in the art will recognize that the area is scaleable for different applications. The matrix area is scaleable by either varying the matrix trace spacing or by varying the number of traces. Large sensor areas are practical where more information is needed.

Besides simple X and Y position information, the sensor technology of the present invention also provides finger pressure information. This additional dimension of information may be used by programs to control special features such as "brushwidth" modes in Paint programs, special menu accesses, etc., allowing provision of a more natural sensory input to computers. It has also been found useful for implementing "mouse click and drag" modes and for simple input gestures.

The user will not even have to touch the surface to generate the minimum reaction. This feature can greatly minimize user strain and allow for more flexible use.

The sense system of the present invention depends on a transducer device capable of providing position and pressure information regarding the object contacting the transducer. Referring first to FIGS. 1a–1d, top, bottom, composite, and cross-sectional views, respectively, are shown of a presently-preferred touch sensor array for use in the present invention. Since capacitance is exploited by this embodiment of the present invention, the sensor surface is designed to maximize the capacitive coupling.

A presently preferred sensor array 10 according to the present invention comprises a substrate 12 including a set of first conductive traces 14 disposed on a top surface 16 thereof and run in a first direction to comprise row positions of the sensor array 10. A set of second conductive traces 18 are disposed on a bottom surface 20 thereof and run in a second direction preferably orthogonal to the first direction to form the column positions of the sensor array 10. The sets of first and second conductive traces 14 and 18 are alternately in contact with periodic sense pads 22 comprising enlarged areas, shown as diamonds in FIGS. 1a–1c. While sense pads 22 are shown as diamonds in FIGS. 1a–1c, any shape, such as circles, which allows close packing of the sense pads 22 is equivalent for purposes of this invention. As an arbitrary convention herein, the set of first conductive traces 14 will be referred to as being oriented in the "X" or "row" direction and may be referred to herein sometimes as "X lines" and the set of second conductive traces 18 will be referred to as being oriented in the "Y" or "column" direction and may be referred to herein sometimes as "X lines".

The number and spacing of these sense pads 22 depends upon the resolution desired. For example, in an actual embodiment constructed according to the principles of the present invention, a 0.10 inch center-to-center diamond-shaped pattern of sense pads disposed along a matrix of 15 rows and 15 columns of conductors is employed. Every other sense pad 22 in each direction in the pad pattern is connected to sets of first and second conductive traces 14 and 18 on the top and bottom surfaces 16 and 20, respectively of substrate 12.

Substrate 12 may be a printed circuit board, a flexible circuit board or any of a number of available circuit interconnect technology structures. Its thickness is unimportant as long as contact may be made therethrough from the set of second conductive traces 18 to their sense pads 22 on the top surface 16. The printed circuit board comprising substrate 12 can be constructed using standard industry techniques. Board thickness is not important. Connections from the sense pads 22 to the set of second conductive traces 18 may be made employing standard plated-through hole techniques well known in the printed circuit board art.

In an alternate embodiment of the present invention, the substrate 12 may have a thickness on the order of 0.005 to 0.010 inches. Then the diamonds on the top surface 16 and the plated through holes that connect to the set of second conductive traces 18, can be omitted, further reducing the cost of the system.

An insulating layer 24 is disposed over the sense pads 22 on top surface 16 to insulate a human finger or other object therefrom. Insulating layer 24 is preferably a thin layer (i.e., approximately 5 mils) to keep capacitive coupling large and may comprise a material, such as mylar, chosen for its protective and ergonomic characteristics. The term "significant capacitive coupling" as used herein shall mean capacitive coupling having a magnitude greater than about 0.5 pF.

There are two different capacitive effects taking place when a finger approaches the sensor array 10. The first capacitive effect is trans-capacitance, or coupling between sense pads 22, and the second capacitive effect is self-capacitance, or coupling to virtual ground. Sensing circuitry is coupled to the sensor array 10 of the present invention and responds to changes in either or both of these capacitances. This is important because the relative sizes of the two capacitances change greatly depending on the user environment. The ability of the present invention to detect changes in both self capacitance and trans-capacitance results in a very versatile system having a wide range of applications.

According to the preferred embodiment of the invention, a position sensor system including sensor array 10 and associated touch detector circuitry will detect a finger position on a matrix of printed circuit board traces via the capacitive effect of finger proximity to the sensor array 10. The position sensor system will report the X, Y position of a finger placed near the sensor array 10 to much finer resolution than the spacing between the sets of first and second conductive traces 14 and 18. The position sensor according to this embodiment of the invention will also report a Z value proportional to the outline of that finger and hence indicative of the pressure with which the finger contacts the surface of insulating layer 24 over the sensor array 10.

According to the presently preferred embodiment of the invention, a very sensitive, light-touch detector circuit may be provided using adaptive analog VLSI techniques. The circuit of the present invention is very robust and calibrates out process and systematic errors. The detector circuit of the present invention will process the capacitive input information and provide digital information to a microprocessor.

According to this embodiment of the invention, sensing circuitry is contained on a single sensor processor integrated circuit chip. The sensor processor chip can have any number of X and Y "matrix" inputs. The number of X and Y inputs does not have to be equal. The Integrated circuit has a digital bus as output. In the illustrative example disclosed in FIGS. 1a–1d herein, the sensor array 10 has 15 traces in both the Y and Y directions. The sensor processor chip thus has 15 X inputs and 15 Y inputs.

The X and Y matrix nodes are driven and sensed in parallel, with the capacitive information from each line indicating how close a finger is to that node. The scanned information provides a profile of the finger proximity in each dimension. According to this aspect of the present invention, the profile centroid is derived in both the X and Y directions and is the position in that dimension. The profile curve of proximity is also integrated to provide the Z information.

There are two drive and sense methods employed in the touch sensing technology of the present invention. According to a first and presently preferred embodiment of the invention, the voltages on all of the X lines of the sensor array 10 are simultaneously moved, while the voltages of the Y lines are held at a constant voltage. Next, the voltages on all of the Y lines of the sensor array 10 are simultaneously moved, while the voltages of the X lines are held at a constant voltage. This scanning method accentuates the measurement of capacitance to virtual ground provided by the finger. Those of ordinary skill in the art will recognize that order of these two steps is somewhat arbitrary and may be reversed.

According to a second drive/sense method, the voltages on all of the X lines of the sensor array 10 are simultaneously moved in a positive direction, while the voltages of the Y lines are moved in a negative direction. Next, the voltages on all of the X lines of the sensor array 10 are simultaneously moved in a negative direction, while the voltages of the Y lines are moved in a positive direction. This second drive/sense method accentuates transcapacitance and de-emphasizes virtual ground capacitance. As with the first drive/sense method, those of ordinary skill in the art will recognize that order of these two steps is somewhat arbitrary and may be reversed.

Figure 2:
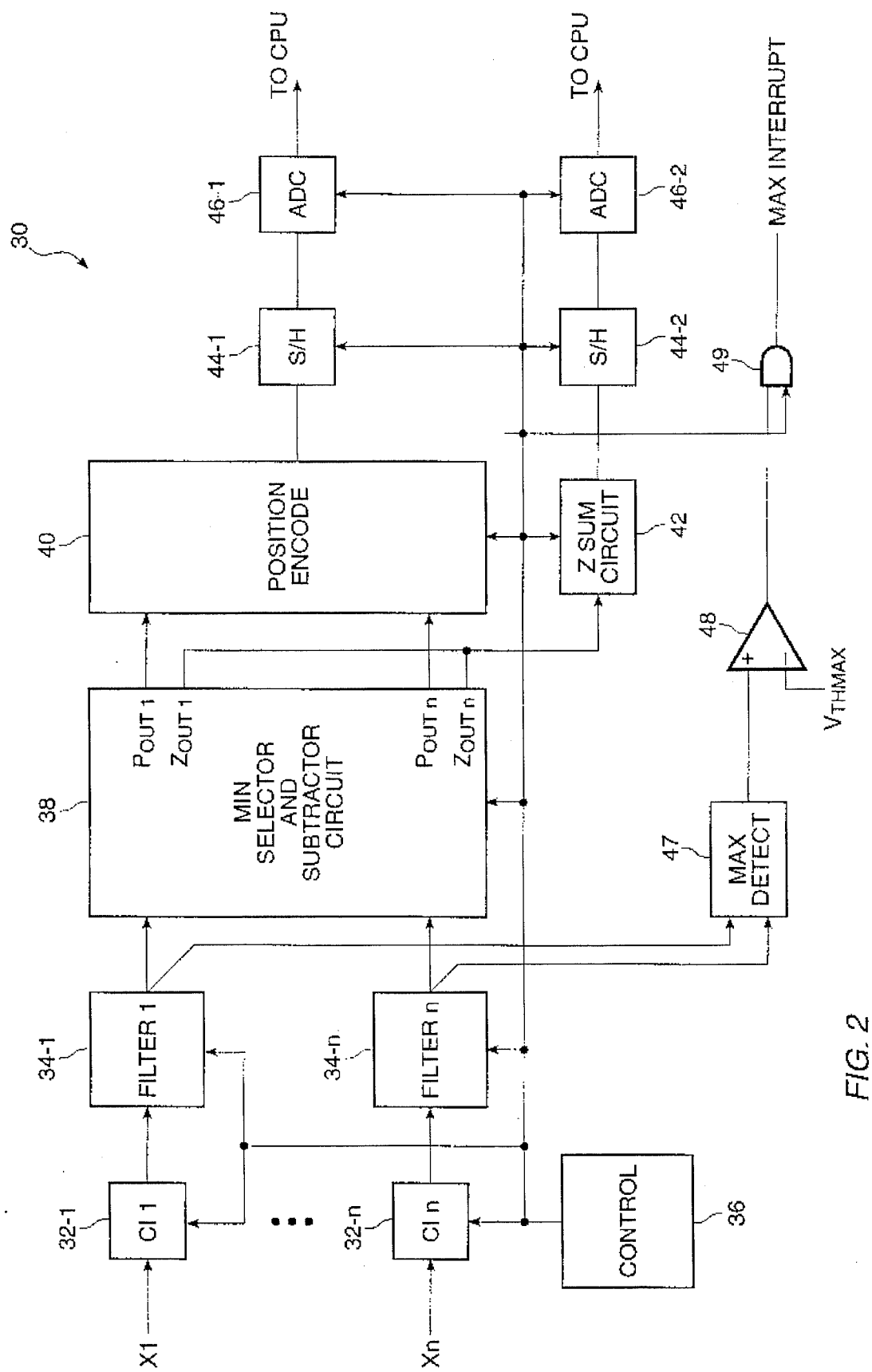
FIG. 2 is a block diagram of sensor decoding electronics which may be used with the sensor transducer in accordance with a preferred embodiment of the present invention.

Referring now to FIG. 2, a block diagram of the presently preferred sensing circuitry 30 for use according to the present invention is presented. This block diagram shows the sensing circuitry 30 in one dimension (X) only. Those of ordinary skill in the art will appreciate that an identical circuit would be used for sensing the opposite (Y) dimension. Such skilled persons will further note that these dimensions do not need to be orthogonal. For example, they can be radial or of any other nature to match the contour of the sensing pad and the needs of the system.

The capacitance at each sensor matrix node is measured simultaneously using charge integrator circuits 32-1 through 32-n. The function of each charge integrator is to develop an output voltage proportional to the capacitance sensed on the corresponding X matrix line.

According to the presently preferred drive/sense method, the capacitance measurements are performed simultaneously across all inputs in one dimension to overcome a problem which is inherent in all prior art approaches that scan individual inputs. The problem with the prior-art approach is that it is sensitive to high frequency and large amplitude noise (large dv/dt noise) that is coupled to the circuit via the touching object. Such noise may distort the finger profile because of noise appearing in a later scan cycle but not an earlier one, due to a change in the noise level. The present invention overcomes this problem by taking a snapshot of all inputs simultaneously. The injected noise is proportional to the finger signal strength across all inputs and therefore symmetric around the finger centroid. Because it is symmetric around the finger centroid it does not affect the finger position.

Because of the nature of the charge integrator circuits 32-1 through 32-n, their outputs will be changing over time and will have the desired voltage output for only a short time. This desired voltage is captured by the filter and sample/hold circuits 34-1 through 34-n. As controlled by the control circuitry, 36, the filter and sample/hold circuits 34-1 through 34-n will capture the desired voltage and store it. Additionally, the result may also be filtered depending on the size of the sample/hold capacitor in the cell.

The filter and sample/hold circuits 34-1 through 34-n then provides an input for the Minimum Selector and Subtractor circuit 38, which computes an average of its n smallest input values (n=3 is presently preferred) and subtracts that value from each input. Minimum Selector and Subtractor circuit 38 then generates a current output for every input which is proportional to the difference at that input between the actual value at the input and the computed average minimum value. This circuit performs the task of subtracting out the background capacitance seen by the sensing circuitry and then providing a current proportional to the additional capacitance seen above the background level. If n=1, then the minimum value is selected. Any n>1 will select an average of the n values.

This current is then replicated and sent to two destinations. One copy is sent to the position encoder circuit 40, and the second is sent to the Zsum circuit 42.

The position encoder circuit 40 uses the current inputs as weights, and provides a scaled weighted mean (centroid) of the set of input currents and their relation to their position in the sensor. Position encoder circuit 40 is a linear position encoder having a voltage output which varies between the power supply rails. Because the circuit produces a continuous weighted mean over all input values, it is capable of interpolation to a much finer resolution than the spacing of the matrix grid spacing.

The output of the position encoder circuit 40 is then presented to sample/hold circuit 44-1 and analog to digital (A/D) converter 46-1. The operation of this portion of the circuit uses devices that are well known to those knowledgeable in the art.

The minimum selector and subtractor circuit 38 also generates a second set of outputs which are all tied together and sent to the Zsum circuit 42. Since these lines are shorted together, the individual output currents are all summed together. The total effect of the finger on the sensor in one dimension is thus integrated, producing a current sum result proportional to the pressure or proximity of the input object. The Zsum circuit 42 takes this current sum and then converts it back to a voltage which is proportional to the current sum. Those of ordinary skill in the art will appreciate that there are many conversion choices depending on the particular use to which the invention is put, it can be a linear conversion, square root (compressive), or squared (expansive). In presently preferred embodiment a compressive conversion is chosen to compress large changes and emphasize small changes, since detecting very light touches is of particular interest.

The output of the ZSum circuit 42 is presented to a sample/hold circuit 44-2 which stores the results. The output of sample/hold circuit 44-2 drives A/D converter circuit 46-2 which converts the analog information to a digital form useable by microcomputers.

Control circuitry 36 of FIG. 2 orchestrates the operation of the remainder of the circuitry. Because the system is discretely sampled and pipelined in its operation, control circuitry 36 is present to manage the signal flow. The functions performed by control circuitry 36 may be conventionally developed via what is commonly known in the art as a state machine or by a microcontroller.

The output of the filter and sample/hold circuits, 34-1 through 34-n, is also monitored by a maximum detector circuit 47. The purpose of this section of circuitry is to generate an interrupt signal to a microprocessor if there is a finger signal greater than a preset threshold. The maximum detector circuit 47 outputs a signal which is related to the largest input voltage. This signal is then compared against a predetermined threshold, noted as $V_{THMAX}$, with the comparator 48. If the signal is greater than the preset threshold the comparator will output a logic 1 level which, after conditioned with proper timing through AND gate 49, provides an interrupt signal to a microprocessor. Those skilled in the art will recognize that this signal is not limited to being an interrupt and could be used for polling, for example, or in other ways that better fit the needs of the entire system.

Figure 3A:
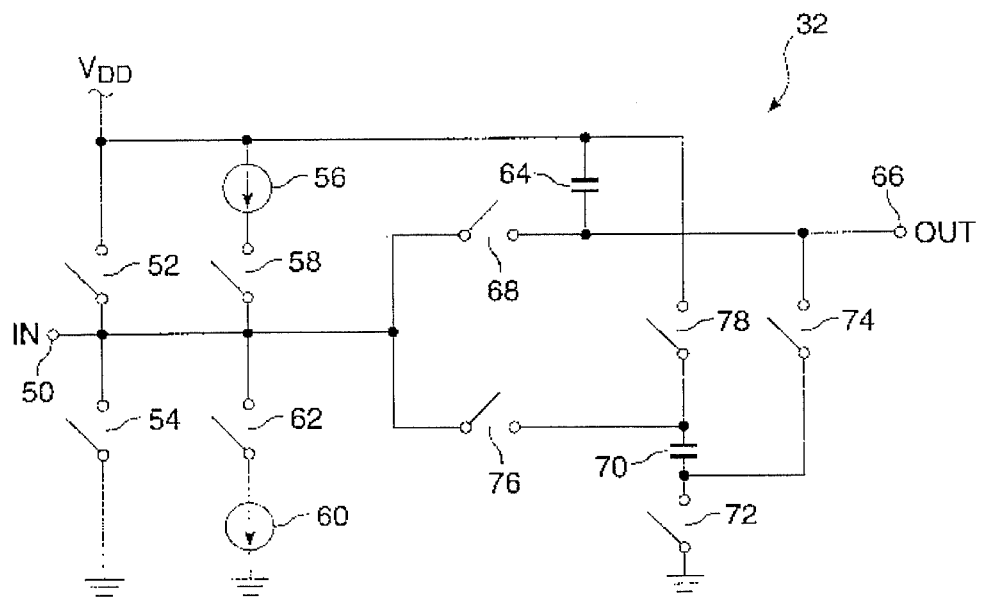
FIG. 3a is a simplified schematic diagram of a charge integrator circuit which may be used in the present invention.
Figure 3B:
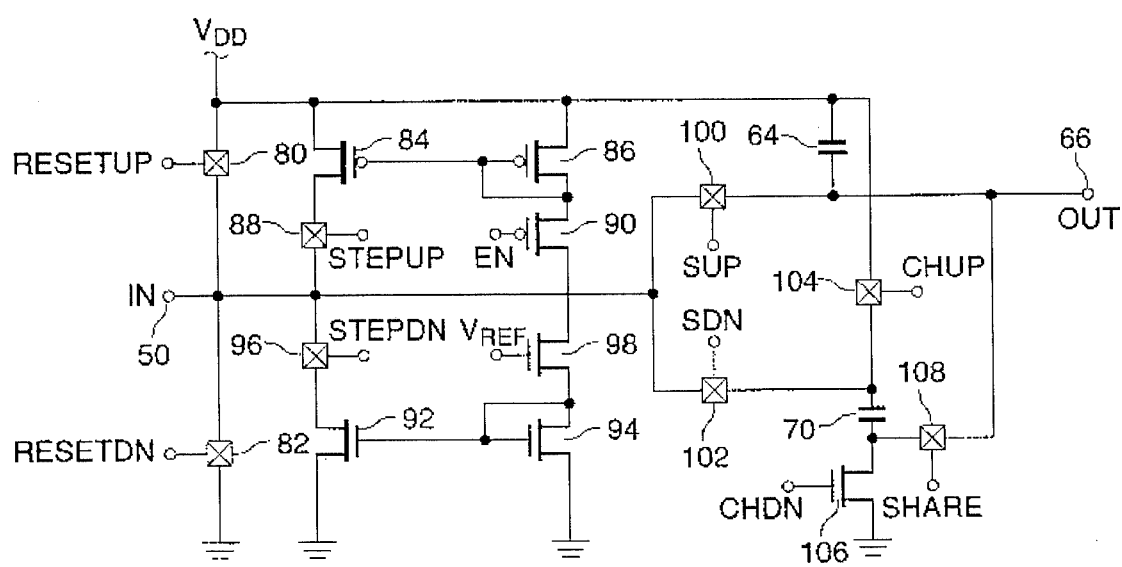
Figure 4:
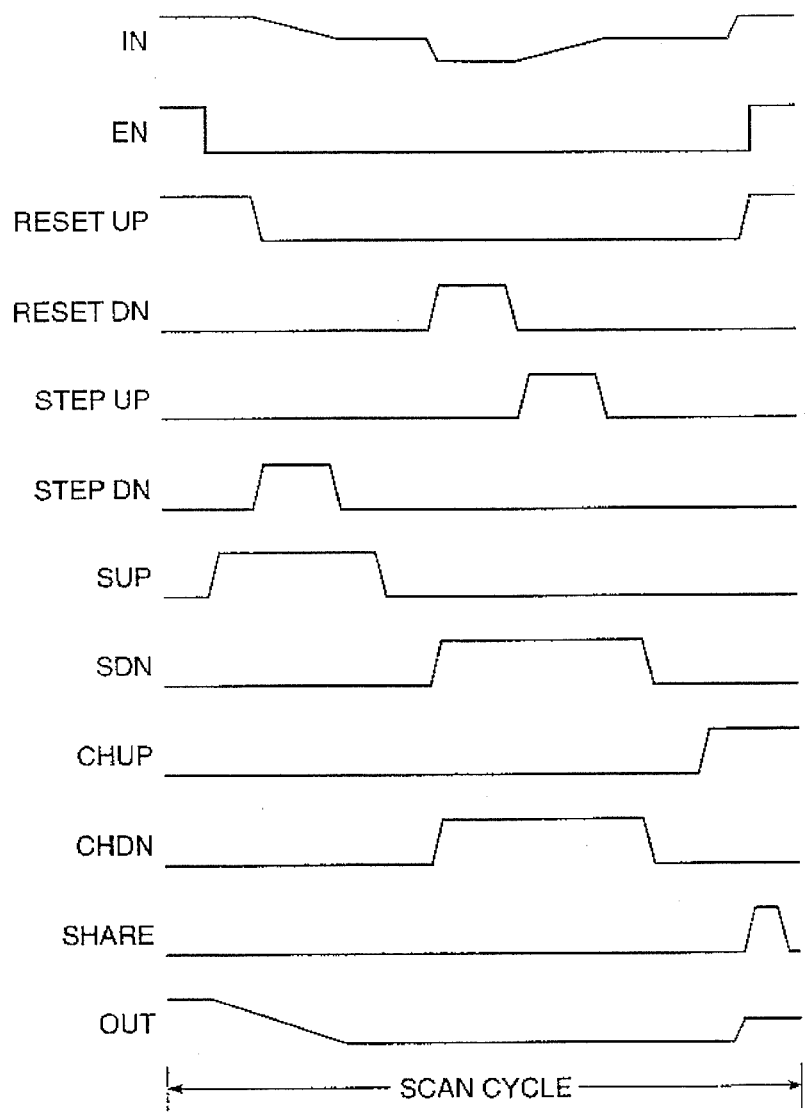
FIG. 4 is a timing of the operation of charge integrator circuit of FIGS. 3a and 3b.

The structure and operation of the individual blocks of FIG. 2 will now be disclosed. Referring now to FIGS. 3a, 3b, and 4, a typical charge integrator circuit will be described. Charge integrator circuit 32 is shown as a simplified schematic diagram in FIG. 3a and as an illustrative schematic diagram in FIG. 3b. The timing of the operation of charge integrator circuit 32 is shown in FIG. 4.

Charge integrator circuit 32 is based on the fundamental physical phenomena of using a current to charge a capacitor. If the capacitor is charged for a constant time by a constant current then a voltage will be produced on the capacitor which is inversely proportional to the capacitance. The capacitance to be charged is the sensor array line capacitance in parallel with an internal capacitor. This internal capacitor will contain the voltage of interest.

Referring now to FIG. 3a, a simplified schematic diagram of an illustrative charge integrator circuit 32 is shown. A charge integrator circuit input node 50 is connected to one of the X (or Y) lines of the sensor array. A first shorting switch 52 is connected between the charge integrator circuit input node 50 and $V_{DD}$, the positive supply rail. A second shorting switch 54 is connected between the charge integrator circuit input node 50 and ground, the negative supply rail. A positive constant current source 56 is connected to $V_{DD}$, the positive supply rail and to the charge integrator circuit input node 50 and through a first current source switch 58. A negative constant current source 60 is connected to ground and to the charge integrator circuit input node 50 and through a second current source switch 62.

A first internal capacitor 64 is connected between $V_{DD}$ and output node 66 of charge integrator circuit 32. A positive voltage storage switch 68 is connected between output node 66 and input node 50. A second internal capacitor 70 has one of its plates connected to ground through a switch 72 and to output node 66 of charge integrator circuit 32 through a switch 74, and the other one of its plates connected to input node 50 through a negative voltage storage switch 76 and to $V_{DD}$ through a switch 78. The capacitors of first and second internal capacitances 64 and 70 should be a small fraction (i.e., about 10%) of the capacitance of the individual sensor array lines. In a typical embodiment, the sensor array line capacitance will be about 10 pF and the capacitance of capacitors 64 and 70 should be about 1 pF.

According to the presently preferred embodiment of the invention, the approach used is a differential measurement for added noise immunity, the benefit of which is that any low frequency common mode noise gets subtracted out. For the following discussion, it is to be assumed that all switches are open unless they are noted as closed. First, the sensor array line is momentarily shorted to $V_{DD}$ through switch 52, switch 68 is closed connecting capacitor 64 in parallel with the capacitance of the sensor line. Then the parallel capacitor combination is discharged with a constant current from current source 60 through switch 62 for a fixed time period. At the end of the fixed time period, switch 68 is opened, thus storing the voltage on the sensor array line on capacitor 64.

The sensor line is then momentarily shorted to ground through switch 54, and switches 72 and 76 are closed to place capacitor 70 in parallel with the capacitance of the sensor line. Switch 58 is closed and the parallel capacitor combination is charged with a constant current from current source 56 for a fixed time period equal to the fixed time period of the first cycle. At the end of the fixed time period, switch 76 is opened, thus storing the voltage on the sensor array line on capacitor 70.

The first and second measured voltages are then averaged. This is accomplished by opening switch 72 and closing switches 78 and 74, which places capacitor 70 in parallel with capacitor 64. Because capacitors 64 and 70 have the same capacitance, the resulting voltage across them is equal to the average of the voltages across each individually. This final result is the value that is then passed onto the appropriate one of filter and sample/hold circuits 34-1 through 34-n.

The low frequency noise, notably 50/60 Hz and their harmonics, behaves as a DC current component that adds in one measurement and subtracts in the other. When the two results are added together that noise component is canceled out. The amount of noise rejection is a function of how quickly in succession the two charge/discharge cycles are performed. One of the reasons for the choice of the charge integrator circuit FIG. 3a is that it allows measurements to be taken quickly.

Referring now to FIG. 3b, a more complete schematic diagram of an illustrative embodiment of charge integrator circuit 32 of the simplified diagram of FIG. 3a is shown. Input node 50 is shown connected to $V_{DD}$ and ground through pass gates 80 and 82, which replace switches 52 and 54 of FIG. 3a. Pass gate 80 is controlled by a signal ResetUp presented to its control input and pass gate 82 is controlled by a signal ResetDn presented to its control input. Those of ordinary skill in the art will recognize that pass gates 80 and 82, as well as all of the other pass gates which are represented by the same symbol in FIG. 3b may be conventional CMOS pass gates as are known in the art. The convention used herein is that the pass gate will be off when its control input is held low and will be on and present a low impedance connection when its control input is held high.

P-Channel MOS transistors 84 and 86 are configured as a current mirror. P-Channel MOS transistor 84 serves as the current source 56 and pass gate 88 serves as switch 58 of FIG. 3a. The control input of pass gate 88 is controlled by a signal StepUp.

N-Channel MOS transistors 92 and 94 are also configured as a current mirror. N-Channel MOS transistor 92 serves as the current source 60 and pass gate 96 serves as switch 62 of FIG. 3a. The control input of pass gate 96 is controlled by a signal StepDn. P-Channel MOS transistor 90 and N-Channel MOS transistor 98 are placed in series with P-Channel MOS current mirror transistor 86 and N-Channel MOS current mirror transistor 94. The control gate of P-Channel MOS transistor 90 is driven by an enable signal EN, which turns on P-Channel MOS transistor 90 to energize the current mirrors. This device is used as a power conservation device so that the charge integrator circuit 32 may be turned off to conserve power when it is not in use.

N-Channel MOS transistor 98 has its gate driven by a reference voltage Vref, which sets the current through current mirror transistors 86 and 94. The voltage Vref may be individually adjusted for each charge integrator circuit 32 to compensate for manufacturing variations. Each Vref may be developed from a analog programmable voltage source, such as described in van Steenwijk, Hoen, and Wallinga "A Nonvolatile Analog Voltage Programmable Voltage Source Using VIP MOS EEPROM Structure," IEEE Journal of Solid State Circuits, July 1993. Alternatively, a writable analog reference voltage storage device, such as disclosed in U.S. Pat. No. 5,166,562 may be employed. This allows the circuit to be calibrated in the factory to zero out process variations as well as capacitance variations in the sensor. The calibration focus is to generate a constant and equal output from all the charge integrator circuits 32-1 through 32-n of FIG. 2 if no finger is present. Although the present approach is very robust, those of ordinary skill in the art will also appreciate an embodiment in which calibration will be allowed to occur in real time (via long time constant feedback) thereby zeroing out any long term effects due to sensor environmental changes.

Note that proper sizing of MOS transistors 94 and 98 may provide temperature compensation. This is accomplished by taking advantage of the fact that the threshold of N-Channel MOS transistor 98 reduces with temperature while the mobility of both N-Channel MOS transistors 94 and 98 reduce with temperature. The threshold reduction has the effect of increasing the current while the mobility reduction has the effect of decreasing the current. By proper device sizing these effects can cancel each other out over a significant part of the operating range.

Capacitor 64 has one plate connected to $V_{DD}$ and the other plate connected to the output node 66 and to the input node 50 through pass gate 100, shown as switch 68 in FIG. 3a. The control input of pass gate 100 is driven by the control signal SUp. One plate of capacitor 70 is connected to input node 50 through pass gate 102 (switch 76 in FIG. 3a) and to VDD through pass gate 104 (switch 72 in FIG. 3a). The control input of pass gate 102 is driven by the control signal SDn and the control input of pass gate 104 is driven by the control signal ChUp. The other plate of capacitor 70 is connected to ground through N-Channel MOS transistor 106 (switch 72 in FIG. 3a) and to output node 66 through pass gate 108. The control input of pass gate 108 is driven by control signal Share.

Referring now to FIGS. 3a, 3b and the timing diagram of FIG. 4, the operation of charge integrator circuit 32 during one scan cycle may be observed. First the EN (enable) control signal goes active by going to 0v. This turns on the current mirrors and energizes the charge and discharge current sources, MOS transistors 84 and 92. The ResetUp control signal is active high at this time, which shorts the input node 50 (and the sensor line to which it is connected) to $V_{DD}$. The SUp control signal is also active high at this time which connects capacitor 64 and the output node 66 to input node 50. This arrangement guarantees that the following discharge portion of the operating cycle always starts from a known equilibrium state.

The discharge process starts after ResetUp control signal goes inactive. The StepDn control signal goes active, connecting MOS transistor 92, the discharge current source, to the input node 50 and its associated sensor line. StepDn is active for a set amount of time, allowing the combined capacitance of the sensor line and capacitor 64 to charge down during that time. StepDn is then turned off. A short time later the SUp control signal goes inactive, storing the measured voltage on capacitor 64 to end the discharge cycle.

Next, ResetDn control signal becomes active and shorts the sensor line to ground. Simultaneously the SDn and ChDn control signals become active and connect capacitor 70 between ground and the sensor line. Capacitor 70 is discharged to ground, guaranteeing that the following charge up cycle always starts from a known state.

The chargeup cycle starts after ResetDn control signal becomes inactive and the StepUp control signal becomes active. At this point the current charging source, MOS transistor 84, is connected to the sensor line and the sensor line charges up. The StepUp control signal is active for a set amount of time (preferably equal to the time for the previously-mentioned cycle) allowing the capacitance to charge, and then it is turned off. The SDn control signal then goes inactive, leaving the measured voltage across capacitor 70.

The averaging cycle now starts. First the voltage on capacitor 70 is level shifted. This is done by the ChDn control signal going inactive, letting one plate of the capacitor 70 float. Then the ChUp control signal goes active, connecting the second plate of the capacitor to $V_{DD}$. Then the Share control signal becomes active which connects the first plate of capacitor 70 to output node 66, thus placing capacitors 64 and 70 in parallel. This has the effect of averaging the voltages across the two capacitors, thus subtracting out common mode noise as previously described. This average voltage is also then available on output node 66.

According to the present invention, two different drive/sense methods have been disclosed. Those of ordinary skill in the art will readily observe that the charge integrator circuit 32 disclosed with reference to FIGS. 3a, 3b, and 4 is adaptable to operate according to either scanning method disclosed herein.

Figure 5:
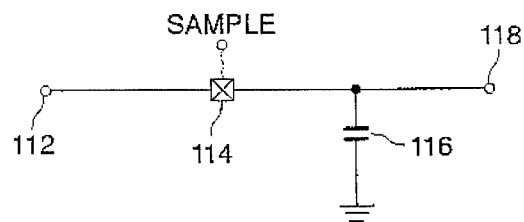
FIG. 5 is a schematic diagram of an illustrative filter and sample/hold circuit for use in the present invention.

As is clear from an understanding of the operation of charge integrator circuit 32, its output voltage is only available for a short period of time. In order to capture this voltage a sample/hold circuit is used. Referring now to FIG. 5, a schematic diagram of an illustrative filter and sample/hold circuit is presented. Those of ordinary skill in the art will recognize this circuit, which comprises an input node 112, a pass gate 114 having a control input driven by a sample control signal, a capacitor 116 connected between the output of the pass gate 114 and a fixed voltage such as ground, and an output node comprising the common connection between the capacitor 116 and the output of the pass gate 114. In a typical embodiment, capacitor 116 will have a capacitance of about 10 pF.

The sample/hold circuit of FIG. 5 is well known in the art, but is applied in a way so that it acts as a filter as well. The filter time constant is K times the sample signal period, where K is the ratio of capacitor 116 to the sum of capacitors 64 and 70 of the charge integrator circuit 32 of FIGS. 3a and 3b. This filter further reduces noise injection. In the preferred embodiment, K=10/2=5.

Figure 6A:
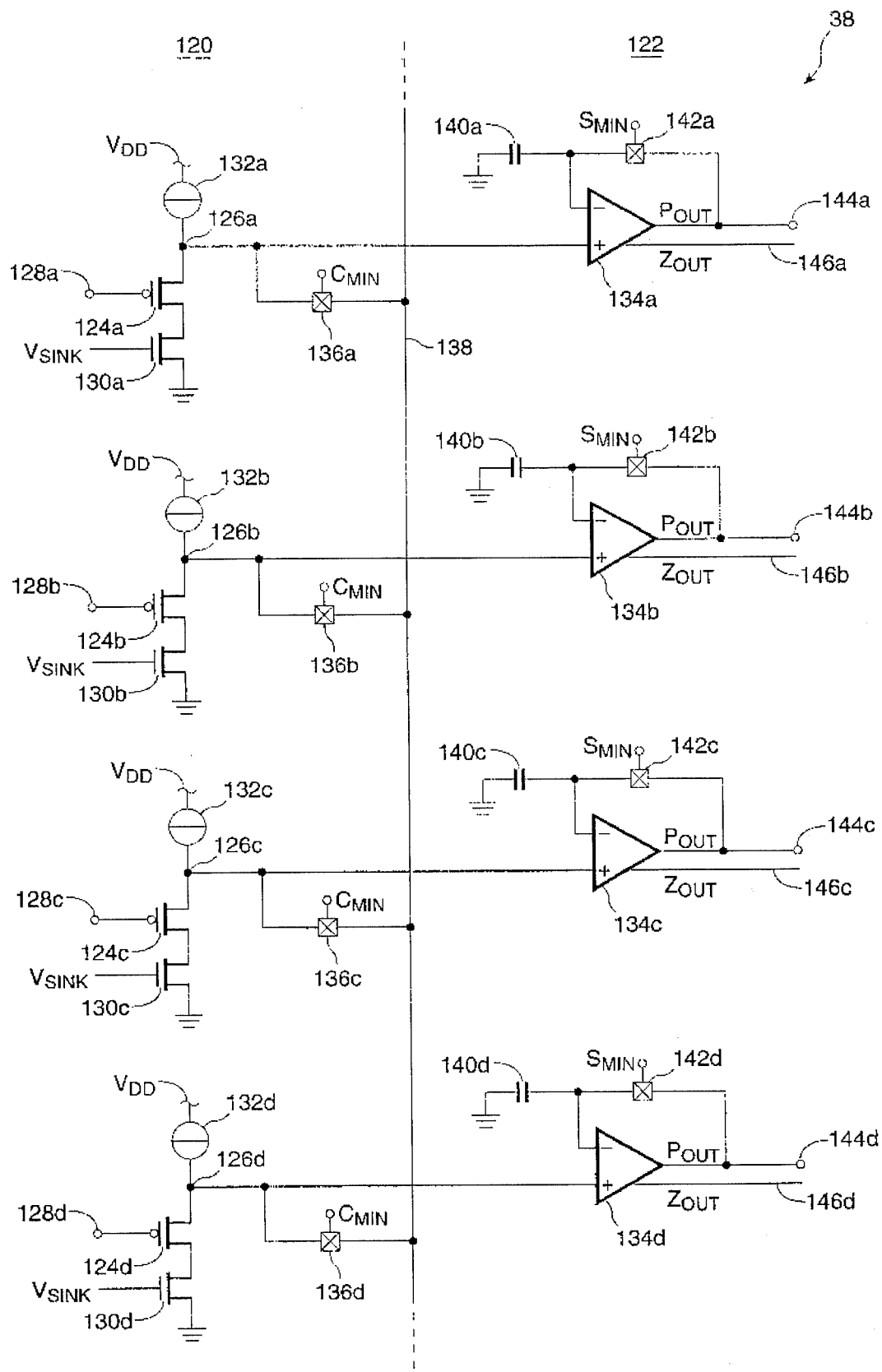
FIG. 6a is a schematic diagram of an illustrative minimum selector and subtractor circuit including peak rejection which may be employed in the present invention, showing circuit details of four individual channels and their interconnection.

As shown in FIG. 2, the output of all of the filter and sample/hold circuits 34-1 through 34-n drive minimum selector and subtractor circuit 38. Referring now to FIG. 6a, a schematic diagram of an illustrative minimum selector and subtractor circuit 38 useful for employment in the present invention is shown. The illustrative circuit of FIG. 6a is shown having four channels, although those of ordinary skill in the art will readily recognize that the circuit could be arbitrarily extended to a larger number of channels.

Figure 6B:
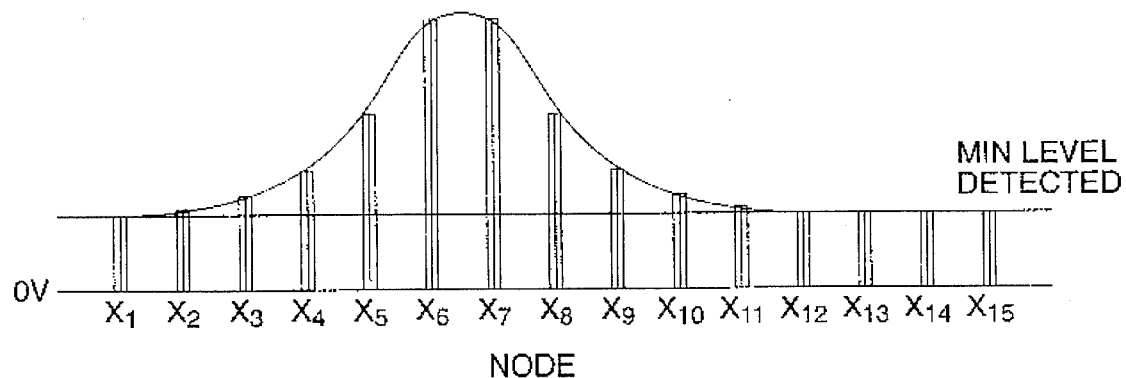
FIG. 6b is a representation of what the output of the minimum selector and subtractor circuit of FIG. 6a would be like without the background level removed.
Figure 6C:
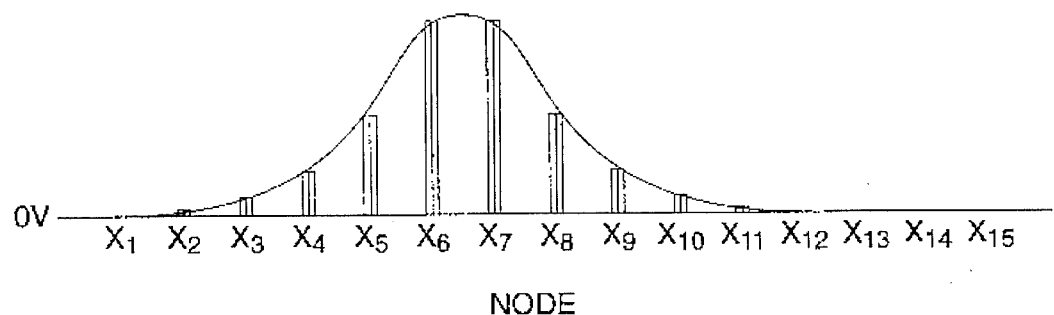
FIG. 6c is a representation of the output of the minimum selector and subtractor circuit of FIG. 6a with the background level removed.

The minimum selector and subtractor circuit 38 is designed to take a set of inputs, detect the average of the three smallest input values and subtract that average value from each individual in the entire input set. The circuit then produces a current which is proportional to this subtracted value, which for most background inputs will be zero. This sequence of steps is illustrated in FIGS. 6b and 6c for an example where there are 15 inputs (X1 to X15) in the set. FIG. 6b shows the input to the minimum selector/subtractor circuit as generated by the filter circuits, 34-1 through 34-n. The drawing shows a typical finger profile with the background or minimum level noted. After the minimum selector and subtractor circuit 38 processes the input, it produces an output like that shown in FIG. 6c, which is the input set with the background value subtracted out.

Each individual channel, even though constituting a single functional unit, can be thought of as consisting of a minimum selector circuit 120 and a subtractor circuit 122. In the minimum selector circuit 120, the active elements are P-channel MOS transistors 124a–124d, each having its source electrode connected to an intermediate node 126a–126d, its gate electrode connected to the channel input nodes 128a–128d, its drain electrode connected to the drain electrodes of N-channel MOS current-limiting transistors 130a–130d, respectively. N-channel MOS transistors 130a–130d have their source electrodes connected to a fixed voltage, such as ground, and their gate electrodes held at a potential $V_{SINK}$ above (more positive than) their source electrodes such that they function as current sinks with limited voltage compliance.

Each intermediate node 126a–126d is also connected to a current source 132a–132d that supplies the operating current of the P-channel MOS transistors 124a–124d from a fixed voltage source $V_{DD}$. Intermediate nodes 126a–126d are also connected to the non-inverting input of an operational transconductance amplifier 134a–134d (OTA), which comprises the heart of the subtractor circuit 122 of each channel. A pass gate 136a–136d allows connecting the intermediate node 126a–126d to a minimum rail 138 which is common to all signal channels in the system. The inverting input of each OTA 134a–134d is connected to a storage capacitor 140a–140d as well as to one end of a pass gate 142a–142d which permits selectively connecting the inverting input of the OTA 134a–134d to its Pout output 144a–144d. Each OTA also has a Zout output 146a–146d.

The N-Channel MOS current sink transistors 130a–130d have the effect of limiting the current that any one of the P-channel MOS transistors 124a–124d can draw. As is well known to those of ordinary skill in the art, this is because the common drain connections of the N-channel and P-channel MOS transistors will assume such a potential as to reduce the drain-to-source voltage difference of one or the other of the two transistors far enough to prevent it from drawing more current than the other transistor allows to flow.

If the sink current of N-Channel MOS current sink transistors 130a–130d is chosen to be larger than the current of sources 132a–132d but smaller than the sum of all source currents, then no single P-Channel MOS transistor 124a–124d can conduct all the current in the minimum selection phase of operation. Instead, several transistors have to share it. Thus it may be seen that the minimum select and subtractor circuit of FIG. 6a selects not the absolute minimum of the input voltages of all channels, but rather an average of the several lowest input voltages from among all channels. The gate voltage of the N-Channel MOS current-limiting transistors 130a–130d is selected to set their saturation current to be W/n times the value of the current source 132, where W is the number of channels present in the system and n is the number of channels to be averaged over to obtain the minimum.

For example, assuming an embodiment including fifteen identical signal channels, and the currents of the N-channel MOS transistors 130 in each channel are five times larger than the currents of current sources 132, then the three P-channel transistors 124 with the lowest gate potentials must share the total system current because the total is equal to fifteen times the source current. The effect is to reject or at least attenuate negative peaks on the input voltages. This property is highly desirable in applications where it is expected that several or most channel input voltages will always be equal to a common minimum or baseline potential, but that considerable noise existing on the inputs may create false negative peaks.

Figure 7:
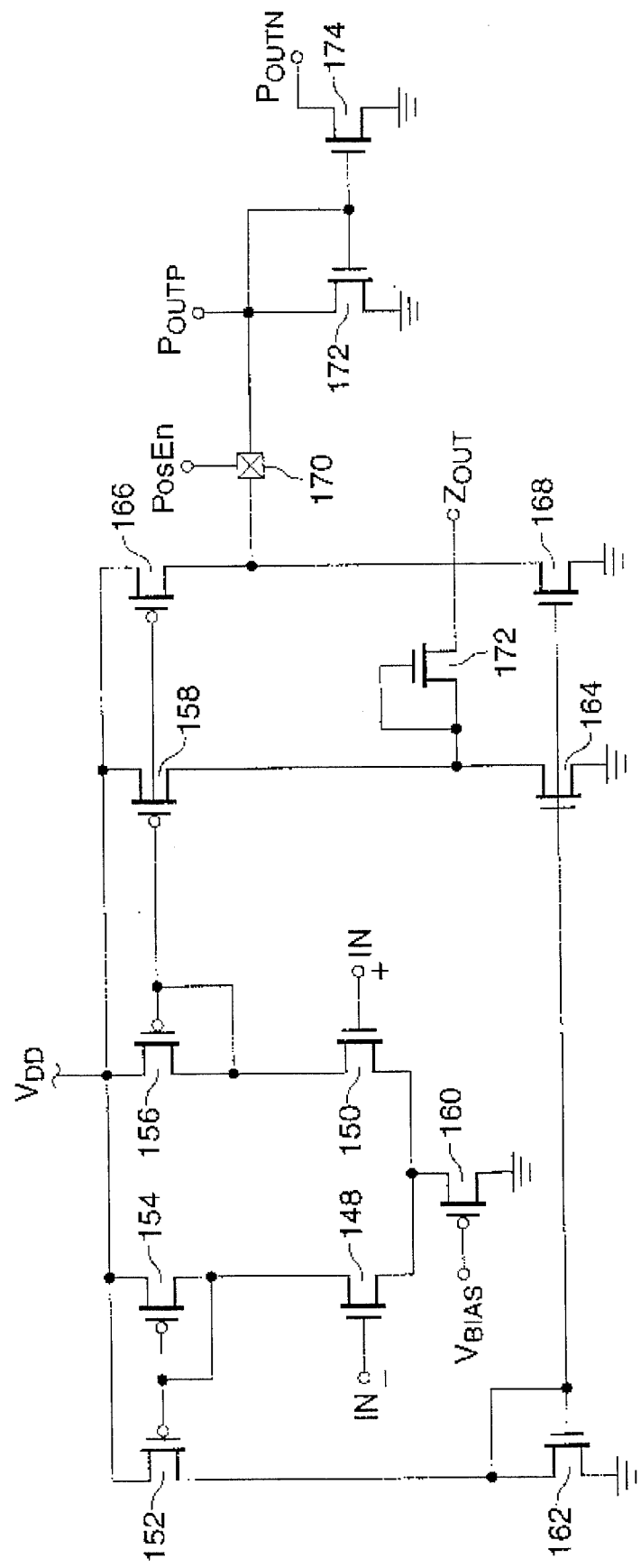
FIG. 7 is a schematic diagram of an illustrative OTA circuit used in the minimum selector and subtractor circuit, showing how the outputs Pout and Zout are derived, and further showing a current sink and source options, Poutn and Poutp, respectively, for the Pout output.

As may be seen from FIG. 6a, each OTA 134a–134d has two output types, designated as Pout 144a–144d and Zout 146a–146d. Referring now to FIG. 7, the circuitry for generating these outputs may be seen in detail. As shown in FIG. 7, each OTA comprises N-Channel MOS input transistors 148 and 150, P-Channel MOS current mirror pairs configured from transistors 152 and 154, 156 and 158, and P-Channel MOS bias transistor 160. An N-Channel MOS current mirror comprising transistors 162 and 164 is connected to P-Channel current mirror transistors 152 and 158 as shown.

As thus far described, the circuit is conventional and the common drain node of transistors 158 and 164 would form an output node for the circuit. An extra P-channel MOS transistor 166 and N-Channel MOS transistor 168 are added to the circuit to form a second output node by replicating the output buffer of the typical wide range output transamplifier. The common drain node of transistors 166 and 168, through pass gate 170, forms the Pout output section of the circuit. The diode-connected N-Channel MOS transistor 172 between the common drain node of transistors 158 and 164 and the Zout node assures that the Zout lines of minimum selector and subtractor circuit 38 will only source current, thus guaranteeing that only object-created signals above the baseline contribute to the Zout signal.

In the presently preferred embodiment of the invention, the Pout outputs of half of the minimum selector and subtractor circuit 38 are configured as current source outputs and may be designated Poutp outputs. The other half of the outputs are current sink outputs and may be designated Poutn outputs. This feature is also shown in FIG. 7. Pass gate 170, controlled by control signal PosEn is present to disconnect the position encode load during the sample phase of the minimum select and subtract circuit. The current source node for the Poutp outputs is at the output of pass gate 170. In this configuration, transistors 176 and 174 are not present and Poutp goes to output Pout. This output would be used to drive the BiasIn line of the position encoder OTA as shown in FIG. 9b. The current sink path is developed from the transamplifier output current at the output of pass gate 170. That current is fed into an NMOS current mirror comprising N-Channel MOS transistors 176 and 174. The drain of N-Channel transistor 176 is the current sink Poutn output node and is connected to output Pout. This output would be used to drive the BiasIn line of the position encoder OTA as shown in FIG. 9c.

Figure 8:
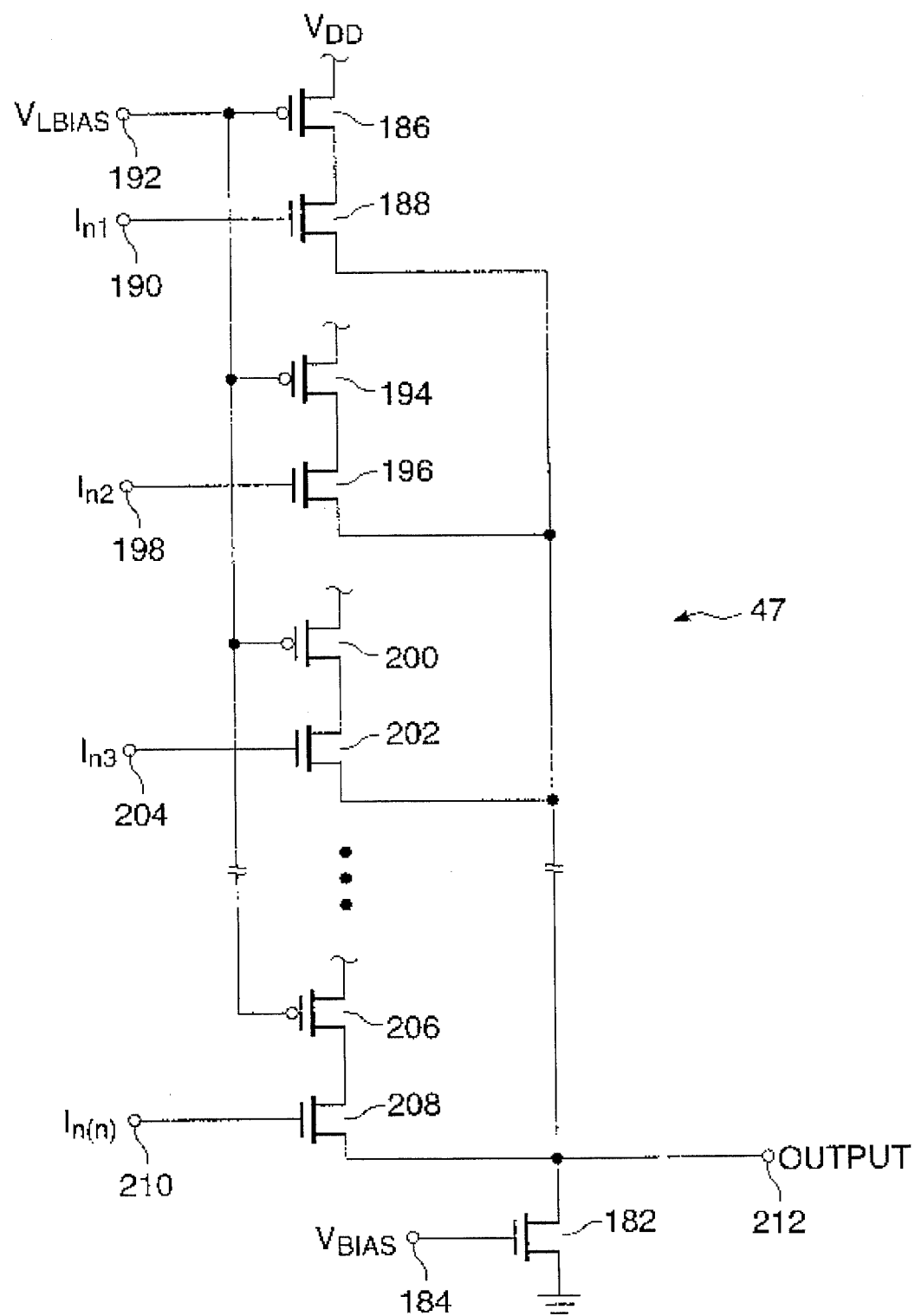
FIG. 8 is a schematic diagram of an illustrative maximum detector circuit which may be used in the present invention.

Referring now to FIG. 8, an illustrative maximum detector circuit 47 for use in the present invention is shown. As previously mentioned, the function of maximum detector circuit 47 is to monitor the outputs of filter and sample/hold circuits, 34-1 through 34-n and to generate an interrupt signal to a microprocessor if there a finger signal greater than a preset threshold $V_{THMAX}$ is present. Those skilled in the art will recognize that the signal is not limited to being an interrupt and could be used for other purposes such as polling etc.

Maximum detector circuit 47 includes an N-channel MOS bias transistor 182 having its source connected to ground and its gate connected to a bias voltage $V_{BIAS}$ at node 184. The inputs of the maximum detector circuit 47 are connected to the outputs of filter and sample/hold 34-1 to 34-n as shown in FIG. 2. In the maximum detector circuit 47 illustrated in FIG. 8, there are (n) inputs. Each input section comprises a series pair of MOS transistors connected between the drain of N-channel MOS bias transistor 182 and a voltage source $V_{DD}$.

Thus, the input section for $In_1$ comprises P-channel MOS current-limiting transistor 186 having its source connected to $V_{DD}$ and its drain connected to the drain of N-channel MOS input transistor 188. The gate of N-channel MOS input transistor 188 is connected to $In_1$ input node 190 and the gate of P-channel MOS current-limiting transistor 186 is connected to a source of bias voltage $V_{LBIAS}$ at node 192.

Similarly, the input section for $In_2$ comprises P-channel MOS current-limiting transistor 194 having its source connected to $V_{DD}$ and its drain connected to the drain of N-channel MOS input transistor 196. The gate of N-channel MOS input transistor 196 is connected to $In_2$ input node 198 and the gate of P-channel MOS current-limiting transistor 194 is connected to node 192.

The input section for $In_3$ comprises P-channel MOS current-limiting transistor 200 having its source connected to VDD and its drain connected to the drain of N-channel MOS input transistor 202. The gate of N-channel MOS input transistor 202 is connected to $In_3$ input node 204 and the gate of P-channel MOS current-limiting transistor 200 is connected to node 192.

The input section for $In_{(n)}$ comprises P-channel MOS current-limiting transistor 206 having its source connected to VDD and its drain connected to the drain of N-channel MOS input transistor 208. The gate of N-channel MOS input transistor 208 is connected to $In_{(n)}$ input node 210 and the gate of N-channel MOS current-limiting transistor 206 is connected to node 192. The sources of N-channel MOS input transistors 188, 196, 202, and 208 are connected together to the drain of N-channel MOS bias transistor 182. The output of maximum detector circuit 47 is node 212 at the common connection of the drain of N-channel MOS bias transistor 182 and the sources of the N-channel MOS input transistors 188, 196, 202, and 208.

The maximum detector circuit 47 acts analogously to the minimum detector circuit 46 of parent application Ser. No. 07/895,934, filed Jun. 8, 1992. The difference is that an N-channel bias transistor is used instead of a P-channel bias transistor and an N-channel transconductance amplifier is used in place of a P-channel transconductance amplifier. The result is the output will now track approximately an N-channel bias drop below the largest input (in non-averaging mode), since that much difference is needed to guarantee at least one input pair is on (186/188, 194/196, . . . 206/208).

However for this circuit the output is not used for feedback, but is instead used to drive a comparator 48 (FIG. 2) which is set to trip if the input is greater than the voltage $V_{Thmax}$. If tripped, a MAX INTERRUPT signal is generated. The MAX INTERRUPT is used to "wake-up" a microprocessor and tell it that there is an object detected at the sensor. The signal is prevented from appearing on the MAX INTERRUPT line by AND gate 49 and a control signal from control circuitry 36. The control signal only allows the interrupt signal to pass after the circuit has settled completely. The control signal presented to AND gate 49 may be a SAMPLE signal which may be generated, for example, by the trailing edge of the SHARE signal shown in FIG. 4.

As may be seen from FIG. 2, the outputs of minimum selector and subtractor circuit 38 are presented to position encoder circuit 40. There are two identical position encoder circuits, one each for the X and Y directions. The function of position encoder circuit 40 is to convert the input information into a signal representing object proximity in the X (or Y) dimension of the sensor array matrix. According to a presently preferred embodiment of the invention, this circuit will provide a scaled weighted mean (centroid) of the set of input currents. The result is a circuit which is a linear position encoder, having an output voltage which varies between the power supply rails. Because it is a weighted mean, it averages all current inputs and can in turn generate an output voltage which represents an X (or Y) position with a finer resolution than the spacing of the matrix grid spacing.

Figure 9A:
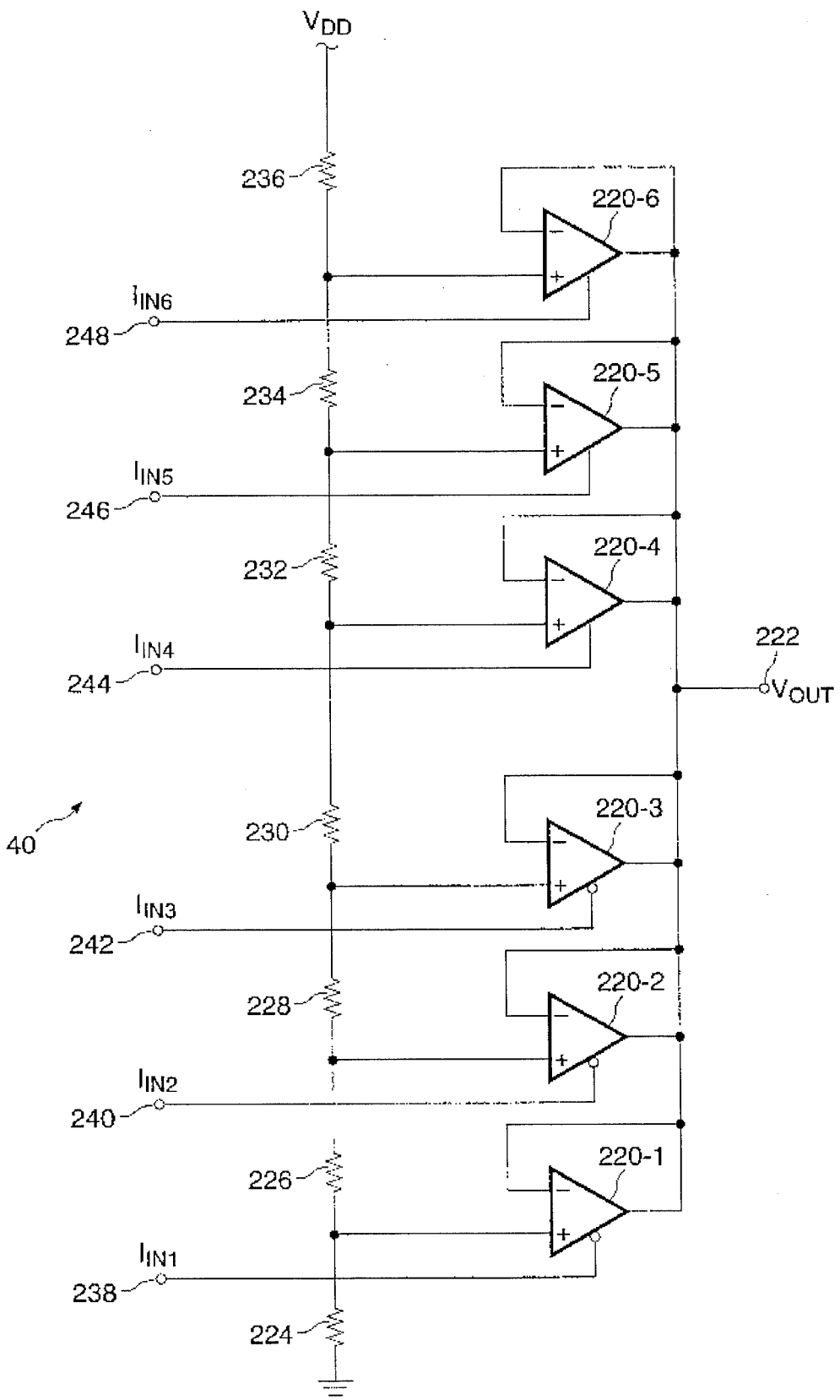
FIG. 9a is a schematic diagram of an illustrative position encoder circuit which may be used in the present invention.
Figure 9B:
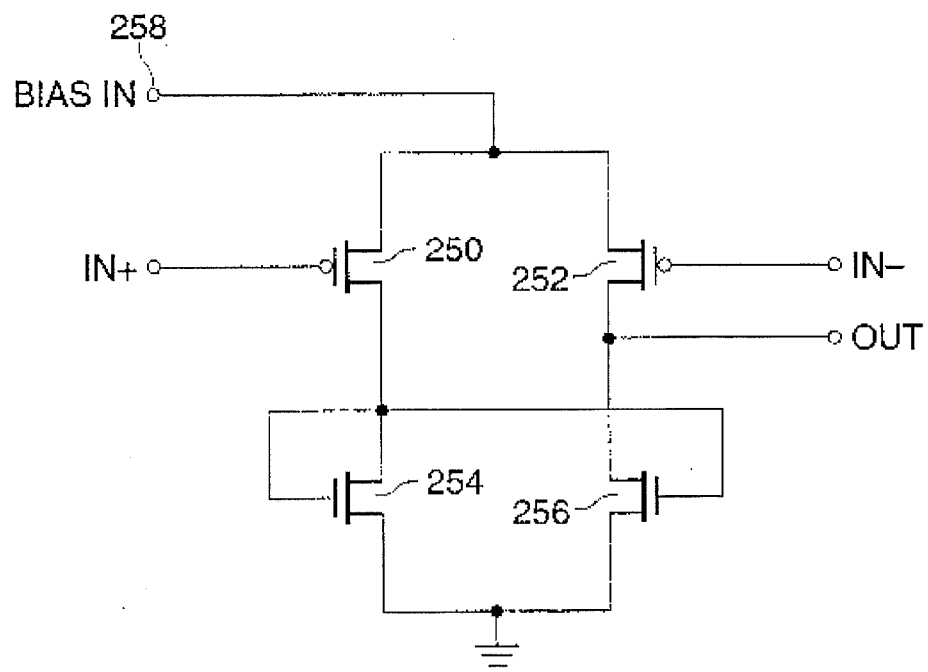
FIG. 9b is a schematic diagram of an P-type OTA circuit which may be used in the position encoder circuit of the present invention.
Figure 9C:
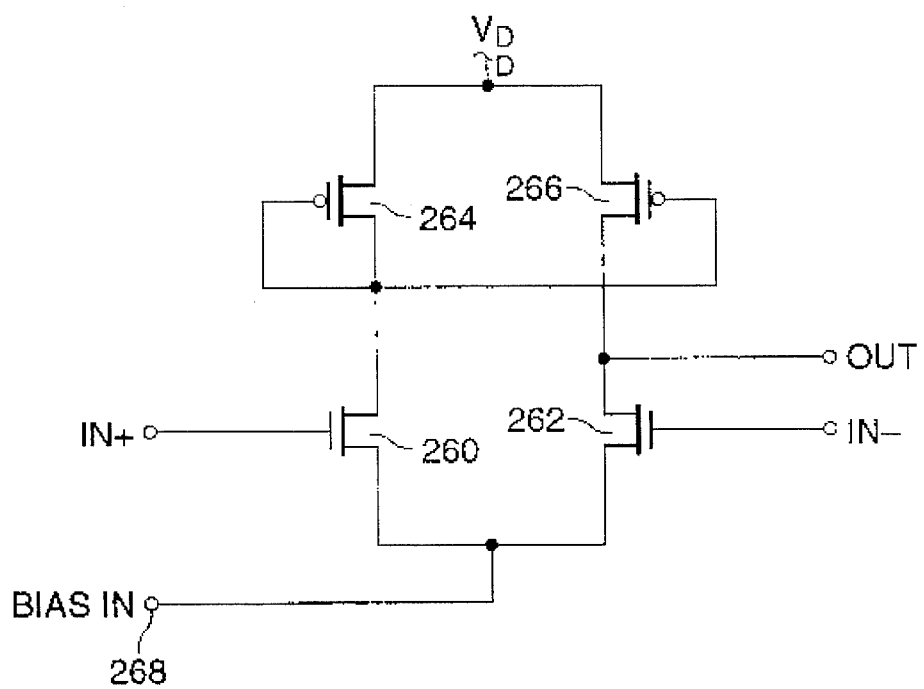
FIG. 9c is a schematic diagram of an N-type OTA circuit which may be used in the position encoder circuit of the present invention.

Referring now to FIG. 9a, a presently preferred embodiment of a position encoder circuit 40 of FIG. 2 is shown in schematic diagram form. Because the position encoder circuits in the X and Y dimensions are identical, only one will be shown. The position encoder circuit 40 of FIG. 9a is shown having six inputs, but those of ordinary skill in the art will recognize that, due to its symmetry, it may be arbitrarily expanded for other numbers of inputs.

As presently preferred, position encoder circuit 38 includes a plurality of transconductance amplifiers 220-1 through 220-6 connected as followers. The outputs of all amplifiers 220-1 through 220-6 are connected together to a common node 222, which comprises the position encoder output node of the circuit 38.

The non-inverting inputs of amplifiers 220-1 through 220-6 are connected to a resistive voltage divider network comprising resistors 224, 226, 228, 230, 232, 234, and 236, shown connected between $V_{DD}$ and ground.

Amplifiers 220-1 through 220-3 have P-channel MOS bias transistors and differential pair inputs due to the input operating range between zero volts and $V_{DD}/2$, and are shown in schematic diagram form in FIG. 9b. The P-Channel MOS devices 250 and 252 form the differential input pair while 254 and 256 form a current mirror load. This is the standard configuration for a typical transconductance amplifier. Normally the bias current is provided by a P-Channel MOS current source device at node 258. However in this application the bias current is provided externally by the Poutp output (output of pass gate 170 in FIG. 7) of the minimum selector/subtractor circuit through nodes 238, 240 and 242 ($I_{IN1}$ through $I_{IN3}$, respectively, of FIG. 9a).

Amplifiers 220-4 through 220-6 have N-channel MOS bias transistors and differential pair inputs due to the input operating range between $V_{DD}/2$ and $V_{DD}$, and are shown in schematic diagram form in FIG. 9c. The N-Channel MOS transistors 260 and 262 form the differential input pair while P-channel MOS transistors 264 and 266 form a current mirror load. This is the standard configuration for a typical transconductance amplifier. Normally the bias current is provided by a N-Channel MOS current source at node 268. However in this application the bias current is provided externally by the Poutn output (drain of transistor 174 in FIG. 7) of the minimum selector and subtractor circuit through nodes 244, 246 and 248 ($I_{IN4}$ through $I_{IN6}$, respectively, of FIG. 9a). Those of ordinary skill in the art will readily recognize that amplifiers 220-4 through 220-6 will be configured exactly like amplifiers 220-1 through 220-3, except that all transistor and supply voltage polarities are reversed.

The position encoder circuit of FIG. 9a will provide a weighted mean (centroid) of the input currents weighted by the voltages on the resistor divider circuit to which the inputs of the amplifiers 220-1 through 220-6 are connected. If the resistors 224, 226, 228, 230, 232, 234, and 236 are all equal then the result is a circuit which is a linear position encoder, with its output voltage varying between the power supply rails. Because it is a weighted mean, it averages all current inputs which in turn generates an interpolated output. This arrangement affords finer resolution than the voltage spacing of voltage nodes "n" at the input. This is key to making a dense circuit function. This circuit is an improvement of a circuit described in DeWeerth, Stephen P., Analog VLSI Circuits For Sensorimotor Feedback, Ph.D Thesis, California Institute of Technology, 1991.

The output voltage of X position encoder circuit 40 is presented to sample/hold circuit 44-1, the output of which, as is well known in the art, either follows the input or holds a value present at the input depending on the state of its control input. The structure and operation of sample/hold circuits are well known in the art.

The output of sample/hold circuit 44-1 drives the input of analog-to-digital (A/D) converter 46-1. The output of A/D converter 46-1 is a digital value proportional to the position of the object in the X dimension of the sensor array matrix 10.

Figure 10:
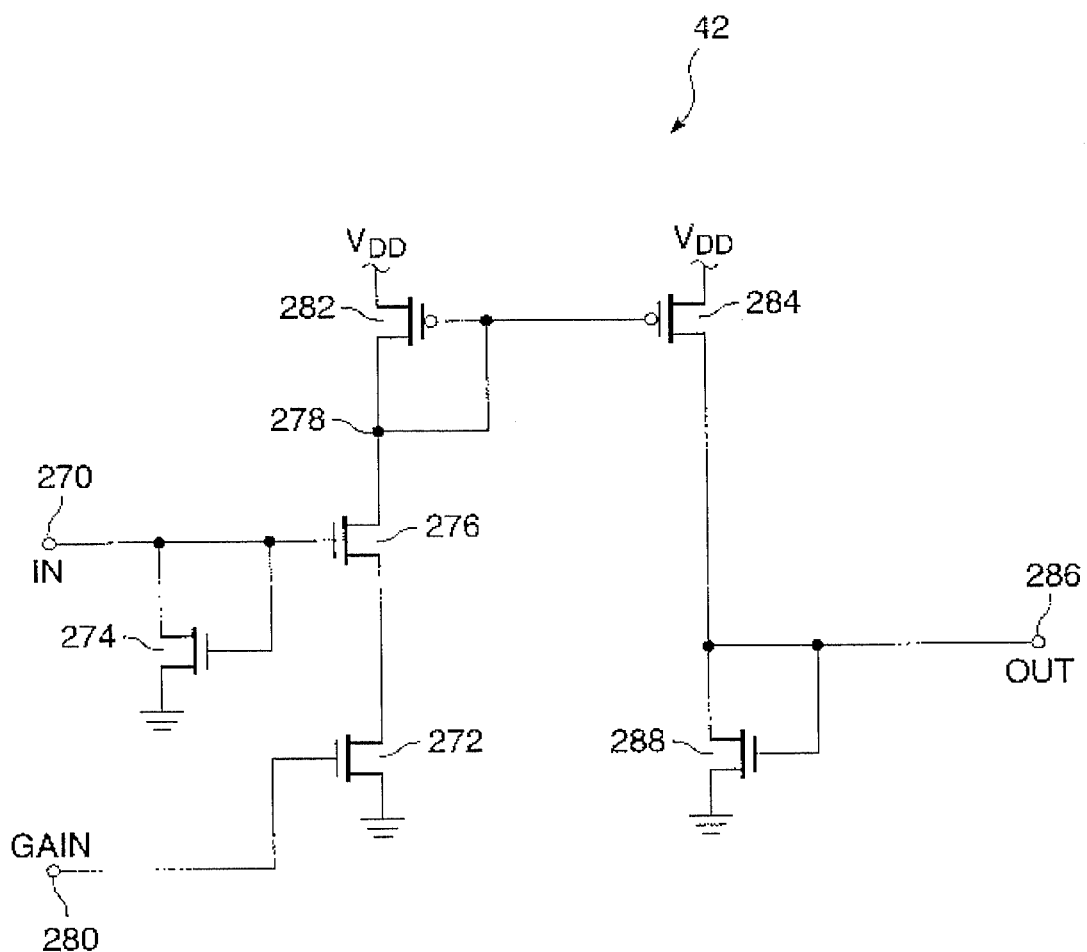
FIG. 10 is a schematic diagram of an illustrative ZSum circuit which may be used in the present invention.

Referring now to FIG. 10, a schematic diagram of a presently preferred embodiment of a ZSum circuit 42 is shown. ZSum circuit 42 takes a current as an input on node 270. If N-Channel MOS transistor 272 was not present then the combination of N-Channel MOS transistors 274 and 276 would be a current mirror and the current on input node 270 would appear on node 278. Transistor 272 is a source degradation resistor that, depending on the gain setting on node 280, reduces the current mirror transfer factor from an ideal factor of 1 to something less than 1. The smaller the voltage present on node 280 the smaller the transfer factor.

P-Channel MOS transistors 282 and 284 create another current mirror that copies the current in node 278 into node 286, the output node. Diode connected N-Channel MOS transistor 288 converts the current back into a voltage with a square root transfer function or a compressive non-linearity. This is chosen to accentuate the low level currents and hence is suited to process a light touch at the sensor.

The increased sensitivity of the touch sensor system of the present invention allows for a lighter input finger touch which makes it easy for human use. Increased sensitivity also makes it easier to use other input objects, like pen styli, etc. Additionally this sensitivity allows for a trade-off against a thicker protective layer, or different materials, which both allow for lower manufacturing costs.

Greater noise rejection allows for greater flexibility in use and reduced sensitivity to spurious noise problems. Two techniques are employed which allow derivation of the most noise-rejection benefit.

Due to the drive and sense techniques employed in the present invention, the data acquisition rate has been increased by about a factor of 30 over the prior art. This offers several obvious side effects. First, for the same level of signal processing, the circuitry can be turned off most of the time and reduce power consumption by roughly a factor of 30 in the analog section of the design. Second, since more data is available, more signal processing, such as filtering, and gesture recognition, can be performed.

The sensor electronic circuit employed in the present invention is very robust and calibrates out process and systematic errors. It will process the capacitive information from the sensor and provide digital information to an external device, for example, a microprocessor.

Because of the unique physical features of the present invention, there are several ergonomically interesting applications that were not previously possible. Presently a mouse or trackball is not physically convenient to use on portable computers. The present invention provides a very convenient and easy-to-use cursor position solution that replaces those devices.

Examples of some useful applications for the present invention include handheld remote control devices, This would include applications like normal and interactive television systems, and hobby electronic controls (e.g., remote control airplanes). Additionally any system that has an input control box on the end of a cable and requires cursor control input. Examples might be numerical control milling machines, semiconductor test equipment, and other industrial robotic equipment that require a control box on an umbilical cord. In this case the LCD display could be on the top of the control box and the touchpad input on the bottom, analogous and equivalent to what is taught herein.

It also may be convenient to apply this approach to an existing "flip-open" handheld scheduler like the Sharp Wizard, putting the touch pad behind the display. The result would not have all the density benefits as noted herein, however it would now have the benefit of both a cursor pointing device and a keypad input.

It also might be advantageous to apply this pad to the backside of standard notebook/laptop computer. Instead of the touchpad being the same size as the display, its size would probably be scaled down to be something on the order of 2.5"×3.0" and it would likely be placed behind the bottom right or left of the screen. The user would then have to reach up behind the screen to move the cursor. The benefit would be that no additional keyboard surface area is needed (as with the Apple Power Book with its trackball below the spacebar key), and therefore a denser package could be designed.

One particularly advantageous application for the touch sensor technology of the present invention is a handheld computing device. The technology of the present invention brings together a combination of technologies to create a "personal digital assistant"-like device which provides many unique new features and capabilities for the user. First, it applies technologies that are very low power and have a minimum of moving parts, which will result in a longer lasting more reliable system. Second, it creates a new input paradigm which is has a much more convenient user interface and allows for a larger and more readable display while still allowing the device to be small enough to fit in a pocket or purse.

Figure 11:
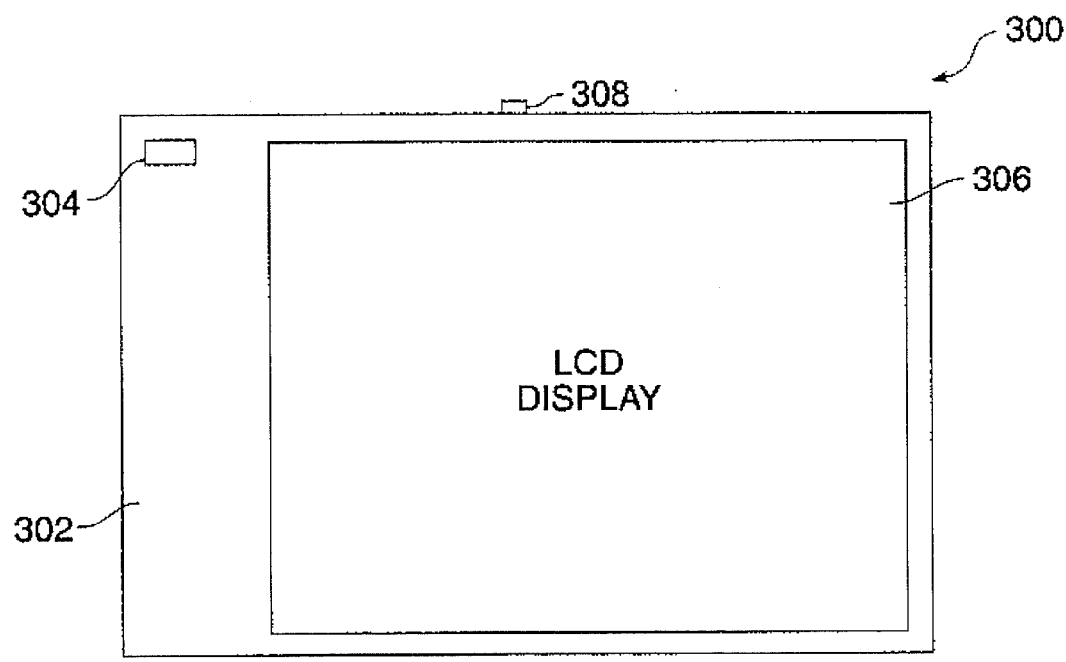
FIG. 11 is a users view of the handheld computing device of the present invention.

Referring now to FIG. 11, a view of an illustrative handheld computing device 300 according to the present invention showing its top face 302 is shown. By referring to the illustrative embodiment shown in FIG. 11, it may be seen that the overall size of the handheld computing device of the present invention may be approximately 2.5"×5.0", of which approximately 2"×3.75" will be available for an LCD display.

As will be appreciated by those of ordinary skill in the art, the human interface of computing device 300 is purposely simple. According to a presently preferred embodiment of the invention, the interface includes a power on/off switch 304, an LCD display 306, and may also include "mouse click" switch 308 mounted on the edge of the module for easy access to the user holding the device. If the preferred embodiment of the touch sensor technology disclosed herein is used, those of ordinary skill in the art will recognize that the mouse click switch 308 may be optional, since its "click" function may be emulated by a gesture, such as a finger tap on touch pad surface 312.

Figure 12:
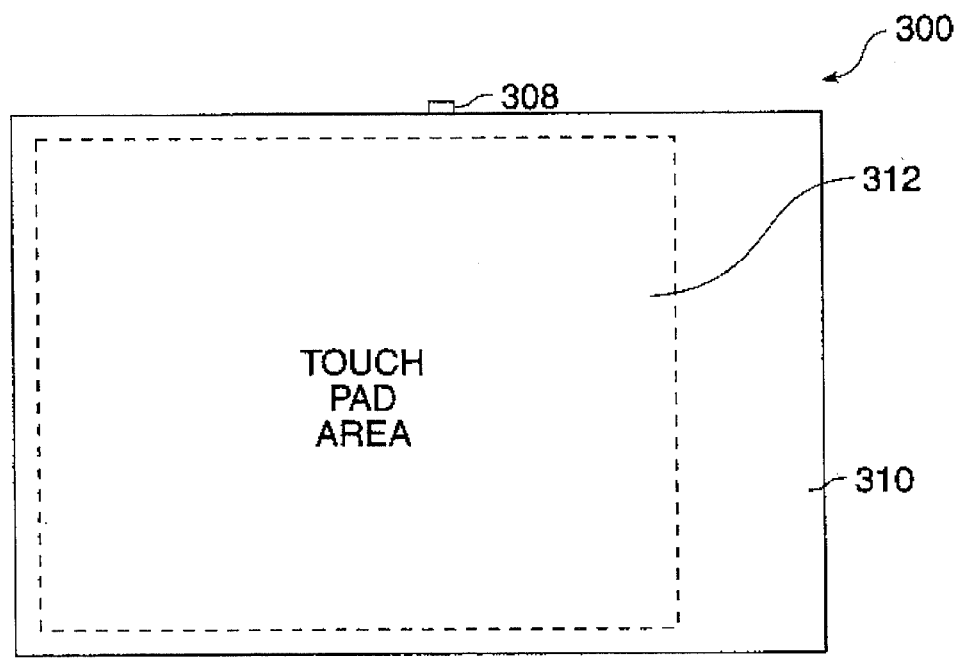
FIG. 12 is a view of the back side of the handheld computing device of the present invention showing the touch pad area which would be positioned directly opposite the display.

Referring now to FIG. 12, a view of handheld computing device 300 revealing bottom face 310 is shown. The "mouse click" switch 308 is visible on the edge of the device. The flat indented area 312 represents a touch pad surface. As presently preferred, touch pad surface 312 is positioned exactly opposite the LCD display 306 on the top surface. Those of ordinary skill in the art will appreciate that the layout of the elements of the handheld computing device 300 allow for ease of operation. By locating the LCD display 306 and touch pad surface 312 on opposing faces 302 and 310, respectively, data may be entered without obscuring the user view of the display 306. In addition, by locating touch pad surface 312 exactly opposite LCD display 306, finger position and movement may be well correlated with information and its position on the display, thus allowing the finger to, in effect, become the "mouse" device.

Figure 13:
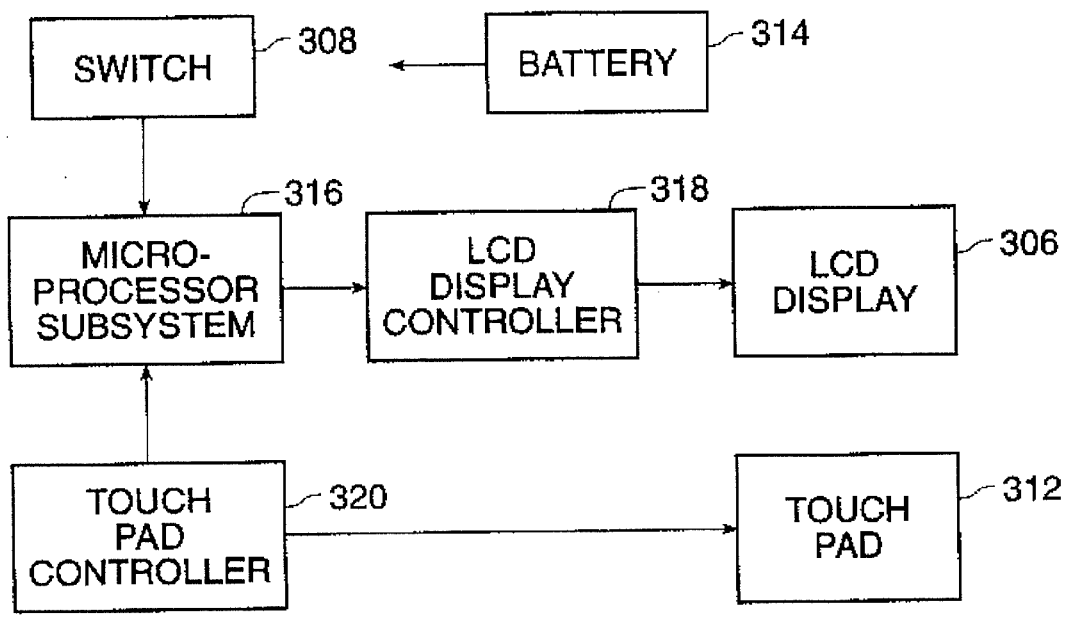
FIG. 13 is an illustrative block diagram of a handheld computing device according to the present invention.

Referring now to FIG. 13, a block diagram of the electronic circuitry of an illustrative and presently preferred embodiment of the handheld computing device of the present invention is shown. One or more batteries 314 may be used to supply power to the handheld calculating device 300. The "mouse click" switch 308 is connected to and read by the microprocessor subsystem 316. The microprocessor subsystem 316 may be a one-chip microcontroller, such as a Motorola 68HC05 family part. Those of ordinary skill in the art will recognize that, at the expense of circuit board area, microprocessor subsystem 316 may also comprise multiple chips including a microprocessor, RAM and ROM memory devices, and a peripheral controller. Those of ordinary skill in the art will recognize those all as commonly used devices. Such skilled persons will also recognize that many combinations of microprocessor subsystems are possible depending on the desired functionality of the module. Additional devices might include an adaptor which allows for fax/modem chips, wireless communications devices, etc. Such variations are dictated by simple design choice and are intended to fall within the scope of the present invention.

The microprocessor subsystem 316 also controls an LCD controller chip set 318 and monitors the touch pad controller 320. LCD controller chip sets are well known in the art and are commonly available components. The touch pad controller chip 320 is interrogated by the microprocessor subsystem 316 to determine if a finger is present and its position on touch pad surface 312. This chip is fully described herein as well as in co-pending application Ser. No. 07/895,934.

The microprocessor subsystem 316 may be programmed with the code necessary to provide the desired functionality, such as a personal scheduler or personal digital assistant. This functionality includes updating the LCD display 306 and peripheral controller chips with the desired output, and communication with the touch pad controller device 320 to determine if a finger is present and if so, determine its location. The particular code written will vary as a function of the chip sets used, and is, again a simple matter of design choice and a routine task well within the level of ordinary skill in the art.

Figure 14:
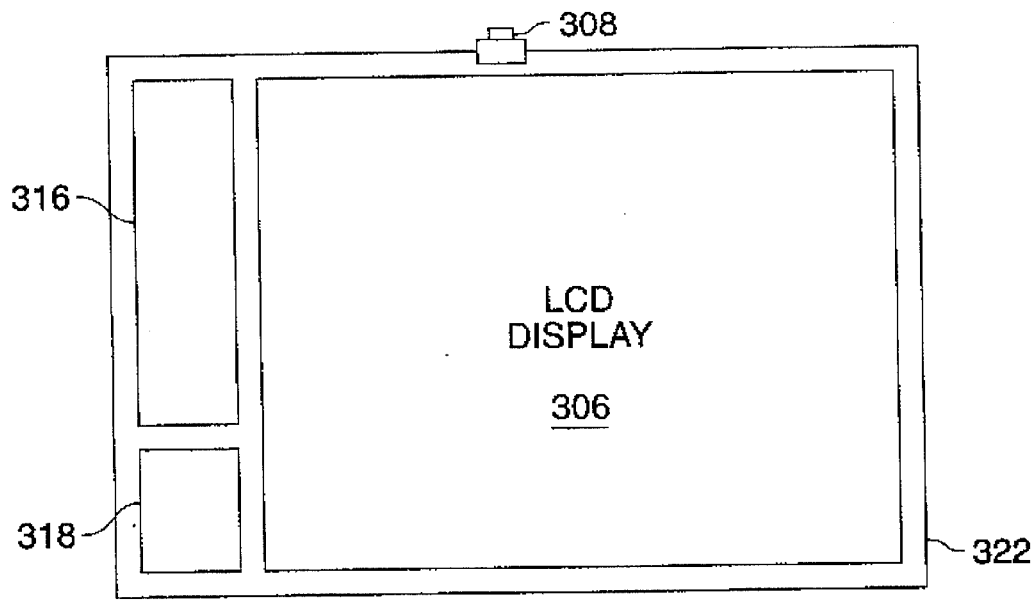
FIG. 14 shows the internal physical layout of an illustrative system printed circuit board from a top view.

Referring now to FIG. 14, a top view of the physical layout of handheld computing device 300 without a top cover is presented. Shown on the top surface of the printed circuit board substrate 322 is the "mouse click" switch 308, the LCD display 306, the LCD controller chip set 318 and an outline of the microprocessor subsystem 316.

Figure 15:
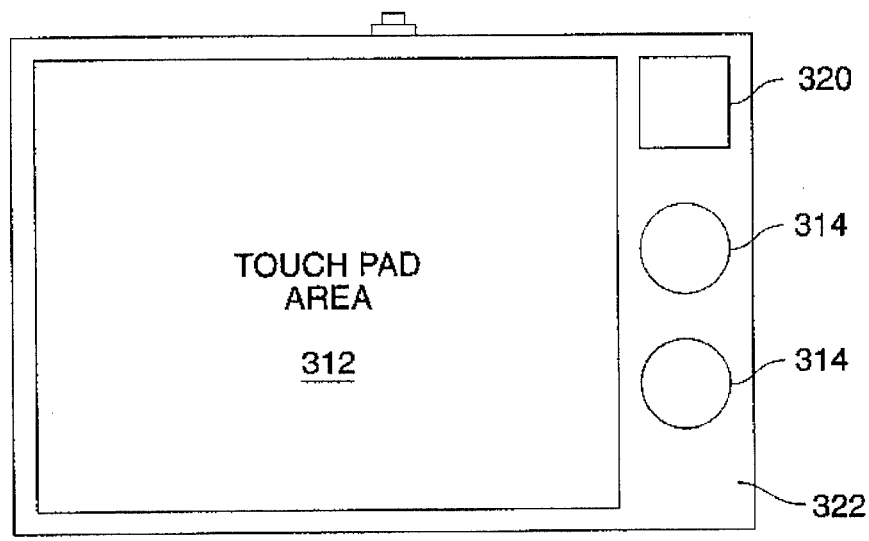
FIG. 15 shows a bottom view of the internal physical layout of the system printed circuit board of FIG. 4.

Referring now to FIG. 15, a bottom view of the physical layout of the handheld computing device 300 without a bottom cover is presented. Those of ordinary skill in the art will note that the touch pad surface 312 comprises a special printed circuit trace configuration of printed circuit substrate 322 and not an additional device which must be mounted thereon. Touch pad controller 320 is shown on this face of the printed circuit board 322. The batteries 314 necessary to power the unit are also shown. These batteries may be, for example, standard 1.5V rechargable button type. Those of ordinary skill in the art will recognize that, depending on the complexity of the system, larger batteries such as standard size AAA or AA may be required.

Those of ordinary skill in the art will readily recognize that the layouts shown in FIGS. 14 and 15 are merely illustrative and not limiting. Such skilled persons will be able to envision other layouts of the system of the present invention which also fall within the scope of the invention.

Figure 16:
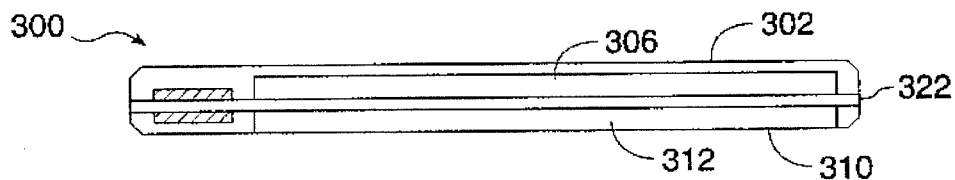
FIG. 16 is a cross-sectional view of the handheld computing device of the present invention viewed from the bottom of the module.

Referring now to FIG. 16, a cross-sectional view of handheld computing device 300 reveals LCD display 306 on the top side 302 of the printed circuit board and the touch pad surface 312 opposite it on the bottom surface 310 of the printed circuit substrate 322.

Figure 17:
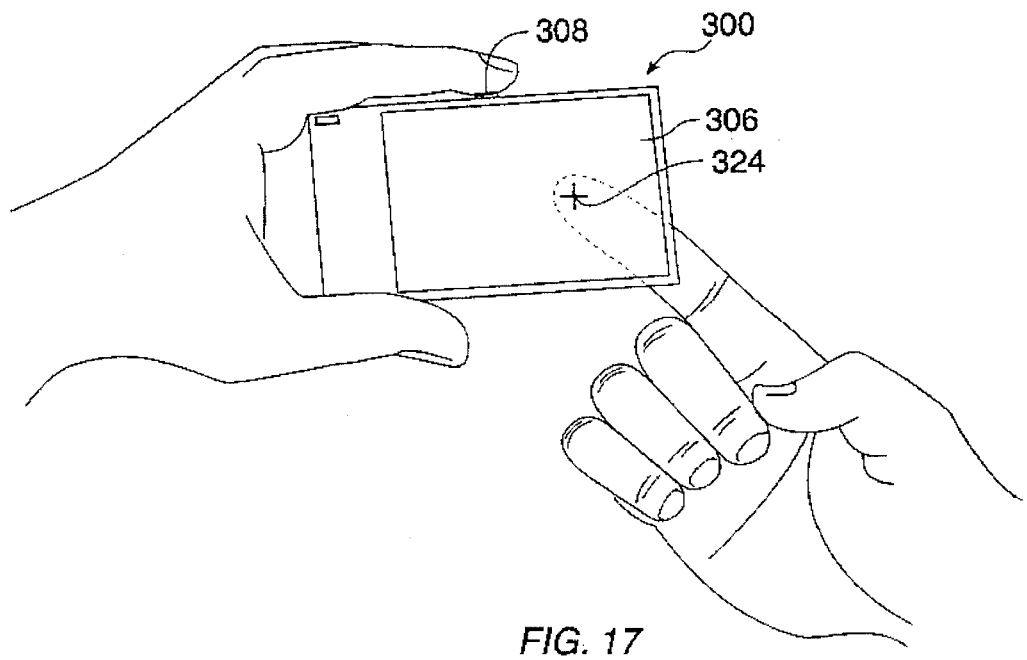
FIG. 17 is a three dimensional rendering showing how a typical user might handle the handheld computing device of the present invention.

FIG. 17 shows the usage ergonomics of the handheld computing device 300. In this example the user is shown holding the handheld computing device 300 in his/her left hand. The user may employ the index finger of the left hand to operate the "mouse click" button 308 while grasping the rest of the handheld computing device 300 between the other fingers and the thumb of the left hand. The right hand and its index finger is then used on the back side as a pointer to a position on the LCD display 306. In the preferred embodiment, the position of the finger is indicated on LCD display 306 by a cursor icon 324.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A handheld computing device comprising:

an enclosure having first face comprising a front panel and second face comprising a rear panel, said first and second faces opposing each other;

a substantially flat visual display disposed on said first face of said enclosure;

a substantially flat touch-sensor transducer disposed on said second face of said enclosure;

computing means contained in said enclosure and coupled to said visual display and to said touch-sensor transducer, said computing means including means for accepting input information from said touch-sensor transducer and for displaying visual information developed from said input information on said visual display.

2. The handheld computing device of claim 1 wherein:

said touch sensitive transducer comprises a matrix of row conductive lines disposed in a first direction and column conductive lines disposed in a second direction generally perpendicular to said first direction, said row conductive lines and said column conductive lines insulated from one another, and an insulating layer disposed over said row conductive lines and said column conductive lines, said insulating layer having a thickness selected to promote significant capacitive coupling between a finger placed on its surface said row conductive lines and said column conductive lines;

and wherein said means for accepting input information from said touch-sensor transducer comprises:

means for simultaneously injecting a known amount of charge onto each of said row conductive lines, and for sensing a row-sense voltage created by said known amount of charge onto each of said row conductive lines;

means for simultaneously injecting a known amount of charge onto each of said column conductive lines, and for sensing a column-sense voltage created by said known amount of charge onto each of said column conductive lines; and means for producing a set of object-sensed electrical signals related to said row-sense voltage and said column-sense voltage.

3. The handheld computing device of claim 2, wherein said means for accepting input information from said touch-sensor transducer further includes:

means for sensing an minimum background capacitance from among said row conductive lines, for sensing an minimum background capacitance from among said column conductive lines, for producing a set of minimum background electrical signals related thereto; and means for subtracting said set of minimum background electrical signals from said set of object-sensed electrical signals.

4. The handheld computing device of claim 2, wherein said means for accepting input information from said touch-sensor transducer further includes:

means for producing a set of average background electrical signals related to said average background capacitance from among said row conductive lines and said average background capacitance from among said column conductive lines; and means for subtracting said set of average background electrical signals from said set of object-sensed electrical signals.

* * * * *

UNITED STATES PATENT AND TRADEMARK OFFICE
CERTIFICATE OF CORRECTION

PATENT NO. : 5,543,588

DATED : August 6, 1996

INVENTOR(S) : Stephen Bissett; Robert J. Miller; Timothy P. Allen; Günter Steinbach It is certified that error appears in the above-indentified patent and that said Letters Patent is hereby corrected as shown below:

On Column 9, line 31, replace "X" with --Y--.

On Column 10, line 42, replace "Y and Y" with --X and Y--.

On Column 11, line 67, replace "Zsum" with --ZSum--.

On Column 12, line 17, replace "Zsum" with --ZSum--.

On Column 13, line 31, replace "capacitances" with --capacitors--.

On Column 14, line 49, replace "van" with --Van--.

On Column 15, line 26, replace "0v" with --0V--.

On Column 16, line 50, replace "selector/subtractor" with --selector and subtractor--.

On Column 17, line 11, replace "134a-134d (OTA)" with --(OTA) 134a-134d--.

On Column 17, line 36, replace "select" with --selector--.

On Column 18, line 53, after "sample/hold" insert --"circuits--.

On Column 19, line 15, replace "VDD" with --$V_{DD}$--.

On Column 19, line 35, after "is" insert --turned--.

On Column 22, line 26, after "lasting" insert --,--.

On Column 13, line 30, replace "capacitors" with --capacitance--.

UNITED STATES PATENT AND TRADEMARK OFFICE
CERTIFICATE OF CORRECTION

PATENT NO. : 5,543,588
DATED : August 6, 1996
INVENTOR(S) : Stephen Bissett; Robert J. Miller; Timothy P. Allen; Günter Steinbach It is certified that error appears in the above-indentified patent and that said Letters Patent is hereby corrected as shown below:

On Column 23, line 8, replace "microcontroller,such" with

--microcontroller, such".

On Column 24, line 66, replace "an" with --a--.

On Column 24, line 67, replace "an" with --a--.

On Column 20, line 51, replace "232,234" with --232, 234--.

Signed and Sealed this

Twenty-first Day of January, 1997

Attest:

BRUCE LEHMAN

Attesting Officer

Commissioner of Patents and Trademarks